(12) United States Patent
Perras et al.

(10) Patent No.: US 12,445,382 B2
(45) Date of Patent: Oct. 14, 2025

(54) APPLICATION MOBILITY BASED ON ENHANCED MPTCP

(71) Applicant: INTERDIGITAL PATENT HOLDINGS, INC., Wilmington, DE (US)

(72) Inventors: Michelle Perras, Montréal (CA); Robert G. Gazda, Spring City, PA (US); Debashish Purkayastha, Collegeville, PA (US); Antonio de la Oliva, Madrid (ES)

(73) Assignee: InterDigital Patent Holdings, Inc., Wilmington, DE (US)

( * ) Notice: Subject to any disclaimer, the term of this patent is extended or adjusted under 35 U.S.C. 154(b) by 299 days.

(21) Appl. No.: 16/964,795

(22) PCT Filed: Jan. 25, 2019

(86) PCT No.: PCT/US2019/015201
§ 371 (c)(1),
(2) Date: Jul. 24, 2020

(87) PCT Pub. No.: WO2019/147970
PCT Pub. Date: Aug. 1, 2019

(65) Prior Publication Data
US 2021/0058329 A1 Feb. 25, 2021

Related U.S. Application Data

(60) Provisional application No. 62/622,586, filed on Jan. 26, 2018.

(51) Int. Cl.
*H04L 47/24* (2022.01)
*H04L 45/24* (2022.01)
(Continued)

(52) U.S. Cl.
CPC .............. *H04L 47/24* (2013.01); *H04L 45/24* (2013.01); *H04L 47/193* (2013.01); *H04L 69/14* (2013.01)

(58) Field of Classification Search
CPC ....... H04L 47/24; H04L 45/24; H04L 47/193; H04L 69/14
See application file for complete search history.

(56) References Cited

U.S. PATENT DOCUMENTS 10,201,029 B2   2/2019   Kekki et al.
10,405,246 B2   9/2019   Huang et al.
(Continued)

FOREIGN PATENT DOCUMENTS

| | | |
|---|---|---|
| EP | 2538637 A2 | 12/2012 |
| EP | 2 924 956 | 9/2015 |
| WO | 2013/082245 | 6/2013 |

OTHER PUBLICATIONS

Vincent Jacquot, Test Bed for Multipath TCP (Year: 2012).*
(Continued)

*Primary Examiner* — Mandish K Randhawa
(74) *Attorney, Agent, or Firm* — VOLPE KOENIG

(57) ABSTRACT

A client application running on a WTRU is configured to communicate data traffic over a TCP session with an MPTCP stack running on the WTRU. The data traffic is exchanged over a first MPTCP sub-flow with a server application over a first mobile edge (ME) host device. The WTRU is anchored to a second ME anchor node. The WTRU receives a first message from a second ME host device indicating that the WTRU should join a second MPTCP sub-flow with the second ME host device. The WTRU joins the second MPTCP sub-flow, responsive to the first message, wherein the second sub-flow is configured not to exchange data traffic. The WTRU receives a second message from the second ME host device configuring the (Continued)

second MPTCP sub-flow to exchange data traffic. The WTRU exchanges the data traffic with the server application over the second MPTCP sub-flow with the second ME host device.

6 Claims, 23 Drawing Sheets

(51) Int. Cl.
  *H04L 47/193* (2022.01)
  *H04L 69/14* (2022.01)

(56) References Cited

U.S. PATENT DOCUMENTS

| | | | | |
|---|---|---|---|---|
| 2017/0078206 | A1* | 3/2017 | Huang | H04L 69/14 |
| 2017/0085484 | A1* | 3/2017 | Hellander | H04L 47/12 |
| 2017/0238215 | A1 | 8/2017 | Jin | |
| 2018/0302941 | A1* | 10/2018 | Li | H04L 69/14 |

OTHER PUBLICATIONS

Defoy et al., "Considerations for MPTCP operation in 5G," Network Working Group, Internet-Draft (Jun. 22, 2018).
Defoy et al., "Considerations for MPTCP operation in 5G," Network Working Group, Internet-Draft (Mar. 2, 2018).
European Telecommunication Standards Institute, "Mobile Edge Computing (MEC); Framework and Reference Architecture," ETSI GS MEC 003 V1.1.1 (Mar. 2016).
Ford et al., "TCP Extensions for Multipath Operation with Multiple Addresses," Internet Engineering Task Force, Internet-Draft (Jul. 28, 2017).
Ford et al., "TCP Extensions for Multipath Operation with Multiple Addresses," Internet Engineering Task Force (IETF), Request for Comments: 6824 (Jan. 2013).
Hesmans et al., "A socket API to control Multipath TCP," MPTCP Working Group, Internet-Draft (Jul. 3, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Purkayastha et al., "Considerations for MPTCP operation in 5G," Network Working Group, Internet-Draft (Oct. 29, 2017).
Scharf et al., "Multipath TCP (MPTCP) Application Interface Considerations," Internet Engineering Task Force (IETF), Request for Comments: 6897 (Mar. 2013).
Third Generation Partnership Project, "Technical Specification Group Services and System Aspects; System Architecture for the 5G System; Stage 2 (Release 15)," 3GPP TS 23.501 V15.0.0 (Dec. 2017).
Third Generation Partnership Project, Technical Specification Group Services and System Aspects; System Architecture for the 5G System; Stage 2 (Release 15),3GPP TS 23.501 V1.5.0 (Nov. 2017).
Third Generation Partnership Project, "Technical Specification Group Services and System Aspects; System Architecture for the 5G System; Stage 2 (Release 15)," 3GPP TS 23.501 V15.4.0 (Dec. 2018).
Yegin et al., "On Demand Mobility Management," DMM Working Group, Internet-Draft (Jul. 30, 2017).

\* cited by examiner

APPLICATION MOBILITY BASED ON ENHANCED MPTCP

CROSS-REFERENCE TO RELATED APPLICATIONS

This application is the U.S. National Stage, under 35 U.S.C. § 371, of International Application No. PCT/US2019/015201 filed Jan. 25, 2019, which claims the benefit of U.S. Provisional Application No. 62/622,586, filed Jan. 26, 2018, the content of which are hereby incorporated by reference herein.

BACKGROUND

As wireless protocols and standards progress, new performance targets may arise from new use cases. For example, in 5G wireless communications, there may be a need for ultra-reliable and low latency communication (URLLC). Example use cases may include autonomous vehicles that perform cooperation and safety functions, monitoring and control of smart grids, tactile feedback for remote medical procedures, control and coordination of unmanned aviation vehicles, robotics, industrial automation, and so forth. Accordingly, it may be desired to create and/or improve various capabilities, such as maintaining a URLLC connection when a device is moving.

SUMMARY

Methods, systems, devices, and a WTRU configured to handle movement of the WTRU. A client application running on a WTRU is configured to communicate data traffic over a TCP session with an MPTCP stack running on the WTRU. The data traffic is exchanged with a server application over a first MPTCP sub-flow with a first mobile edge (ME) host device. The WTRU is anchored to a second ME anchor node. The WTRU receives a first message from a second ME host device indicating that the WTRU should join a second MPTCP sub-flow with the second ME host device. The WTRU joins the second MPTCP sub-flow, responsive to the first message, wherein the second sub-flow is configured not to exchange data traffic. The WTRU receives a second message from the second ME host device configuring the second MPTCP sub-flow to exchange data traffic. The WTRU exchanges the data traffic with the server application over the second MPTCP sub-flow with the second ME host device.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
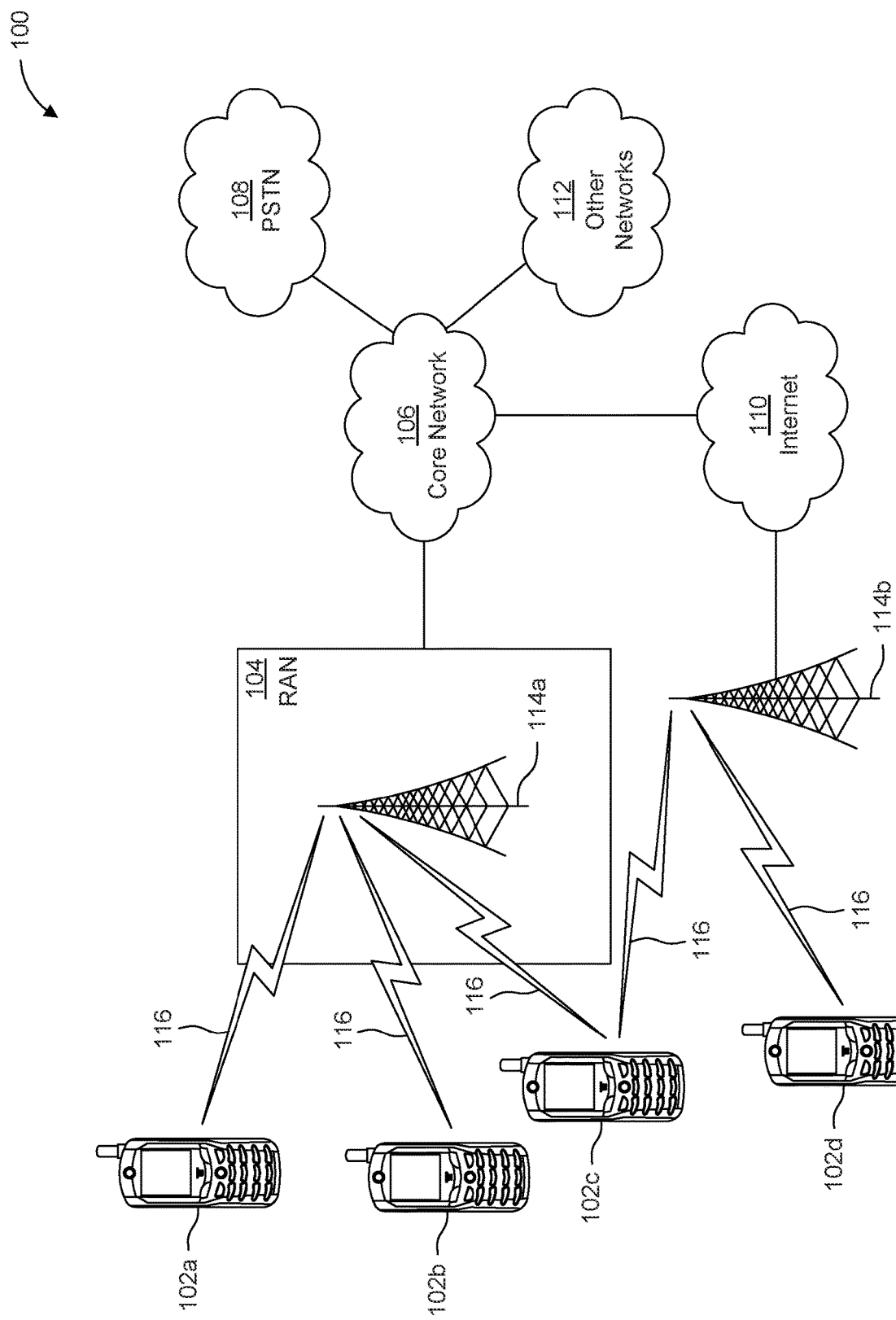
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a Core Network (CN) 106/115, a public switched telephone network (PSTN) 108, the Internet 110, and other networks 112, though it will be appreciated that the disclosed embodiments contemplate any number of WTRUs, base stations, networks, and/or network elements. The CN may be representative of a NextGen Core (NGC) network, such as a 5G system using New Radio (NR). Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as New Radio (NR) Radio Access, which may establish the air interface 116 using (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the VVTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the VVTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
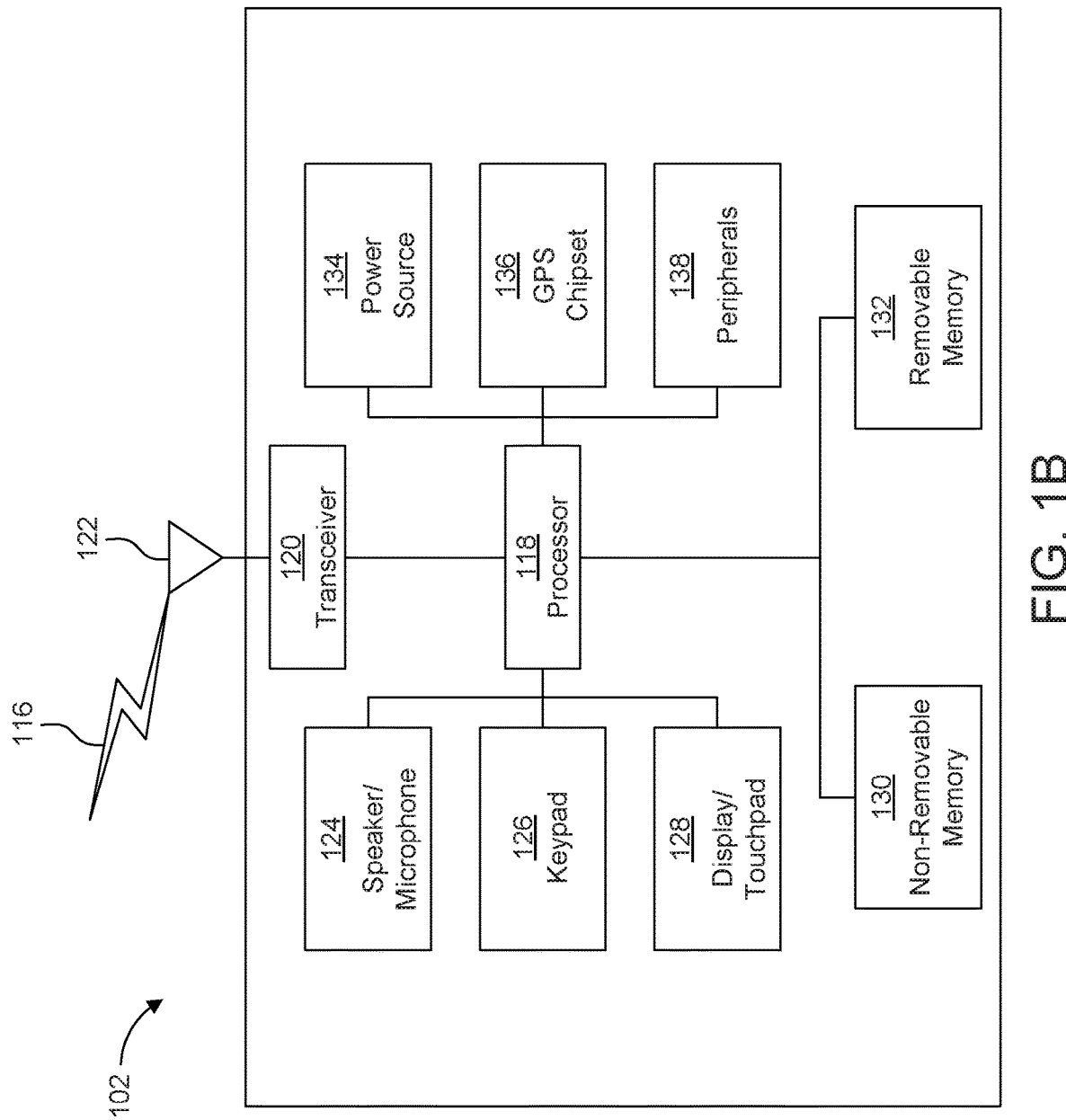
FIG. 1B is a system diagram illustrating an example wireless transmit/receive unit (WTRU) that may be used within the communications system illustrated in FIG. 1A according to an embodiment.
Figure 1C:
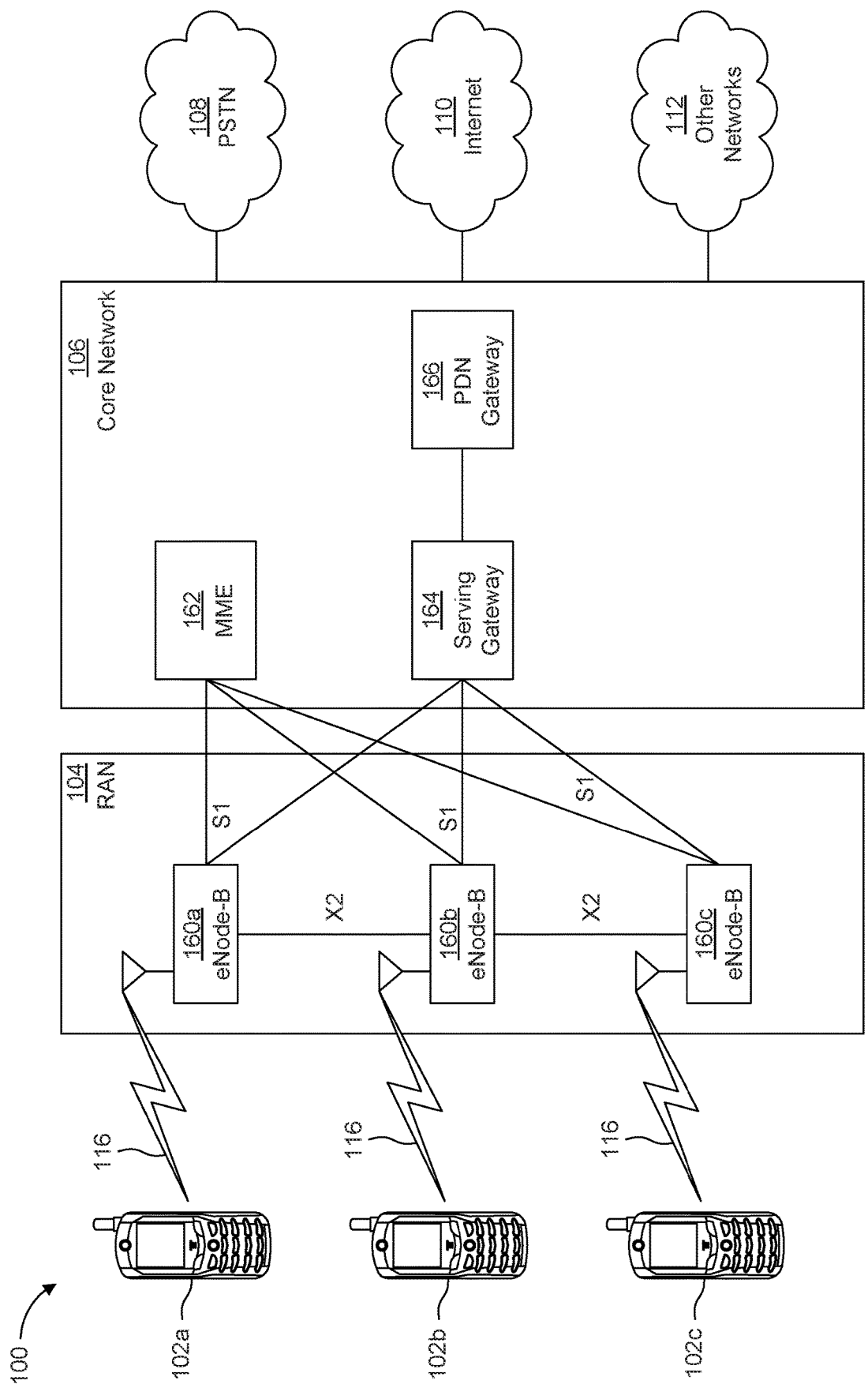
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
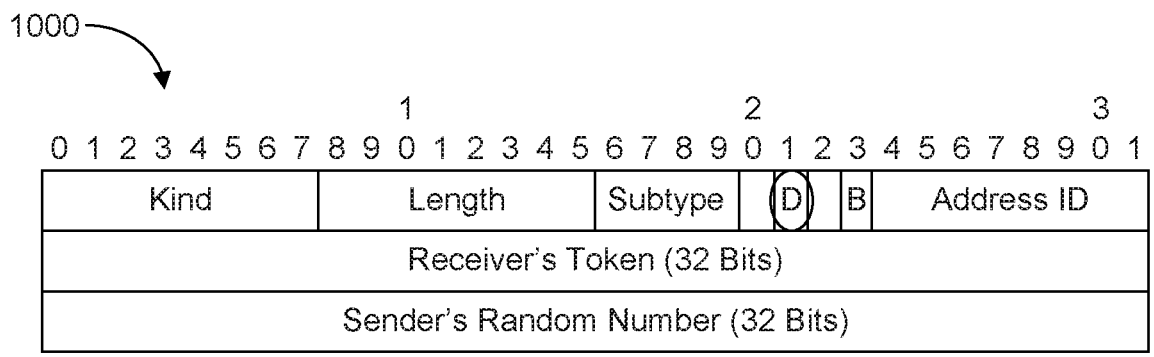
FIG. 10 is a bitmap illustrating an example modified join connection (MP_JOIN) option.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
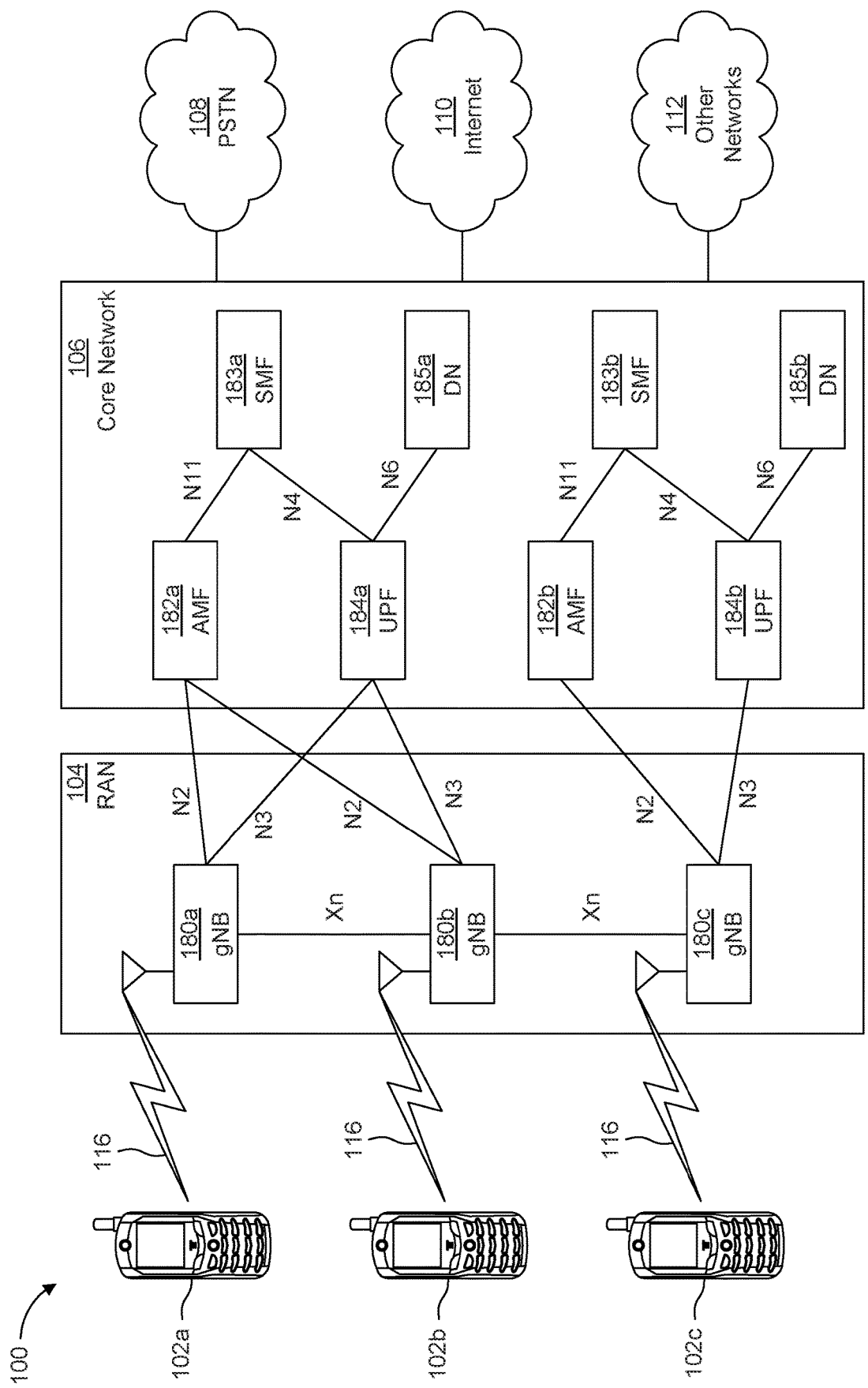
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. The AMF 182a, 182b, UPF 184a, 184b, and SMF 183a, 183b may be the same or different types of devices, the hardware of those devices may comprise of a processor, memory, transceiver, and other data interfaces as necessary. In one example, the AMF 182a, 182b, UPF 184a, 184b, and SMF 183a, 183b hardware may be similar to the hardware of a WTRU as described herein. In another example, each of the AMF 182a, 182b, UPF 184a, 184b, and SMF 183a, 183b may comprise of more than one device. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As discussed herein the following abbreviations may be used: Branching Point (BP); Dual-Stack MIP (DSMIP); General Packet Radio Service (GPRS); GPRS Tunneling Protocol (GTP); Mobile Edge (ME); Mobile Edge Computing, or equivalently, Multi-access Edge Computing (MEC); ME Orchestrator (MEO); ME Platform (MEP); MEP Manager (MEPM); Mobile IP (MIP); Multi-Path TCP (MPTCP); Network Address Translation (NAT); Packet Data Unit (PDU); Proxy Mobile IP (PMIP); Point-of-Access (PoA); Uplink Classifier (UL CL); User Plane Function (UPF); and Ultra-Reliable and Low-Latency Communications (URLLC). Further, an orchestrator, or MEO, may be or include a mobility controller entity within an edge or fog system that triggers ME App relocation across edge hosts. Within the European Telecommunications Standards Institute (ETSI) MEC reference architecture, the orchestrator role may be implemented by an MEO, MEPM, MEP, or a combination of these MEC entities. An ME App may be or include an application (App), running on the network edge, on an ME platform.

In some embodiments, application mobility (e.g., fast application mobility) may be implemented while preserving connectivity with a remote peer. Such mobility may be implemented using MPTCP; e.g., as modified to support MPTCP session mobility.

MPTCP may include support for link failure, load balancing, and bandwidth aggregation capabilities. Multiple sub-flows may be created between two peers to support such cases. In some implementations, MPTCP may be used for other purposes, such as to support application mobility while preserving session connectivity between a client application and a Mobile Edge (ME) application. In some implementations, sub-flows may be created toward different hosts. For example, in such implementations, sub-flows may be created from a WTRU client application toward different targets, resulting in an MPTCP session at the WTRU having a sub-flow toward a first peer and another sub-flow, associated with the same MPTCP session, toward another peer. In such a scenario, a network architecture supporting multi-homing and session continuity, e.g., as defined by 3rd generation partnership project (3GPP™) and/or Internet Engineering Task Force (IETF™) Distributed Mobility Management (DMM) may be assumed.

As discussed herein, session continuity may be maintained using redirection techniques. For example, tunneling protocols like DSMIP, PMIP, or GTP may be used. In some cases, these protocols may be used to allow the WTRU to be reachable at the same IP address, e.g., even if the WTRU moves and attaches to one or more PoAs or serving nodes. For example, in some implementations, data traffic is always directed toward an anchor node which has provided an IP address to the WTRU. If the WTRU moves from the anchor node to another node, such as a serving node, DL traffic may be tunneled from the anchor node toward the serving node, and provided to the WTRU from the serving node. The reverse path may be used in the UL direction (i.e., WTRU to serving node, to anchor node, to correspondent node). In some cases, while tunneling protocols may enable session continuity, the resulting data path may be non-optimal, e.g., increasing latency.

Figure 2:
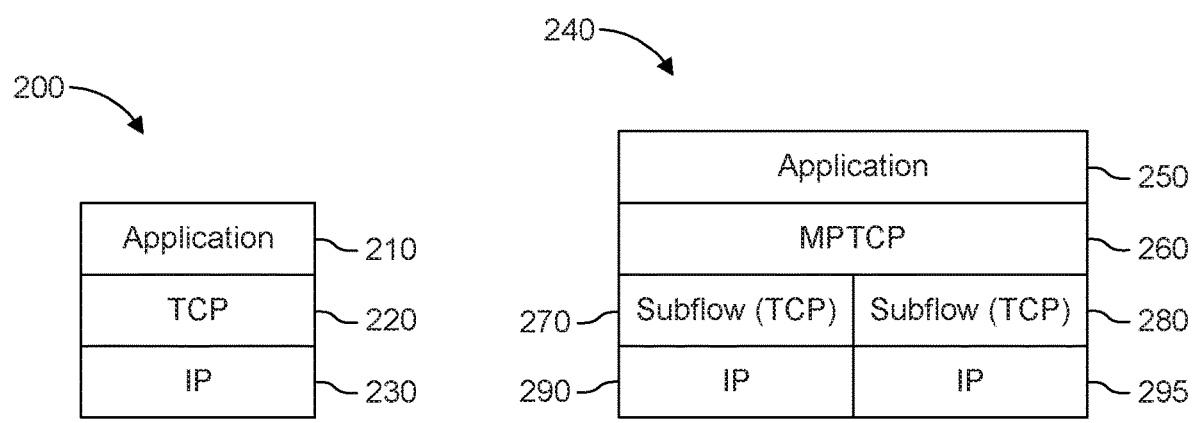
FIG. 2 is a block diagram illustrating an example standard TCP protocol stack and an example standard MPTCP protocol stack.

FIG. 2 is a block diagram illustrating an example of standard application layer and TCP stack 200, and an example application layer and MPTCP protocol stack 240. Application layer and TCP stack 200 includes an application layer 210, and a TCP stack that includes TCP layer 220, and IP layer 230. Application layer and MPTCP protocol stack 240 includes application layer 250, and an MPTCP stack that includes MPTCP layer 260, subflow layers 270 and 280, and IP layers 290 and 295.

MPTCP is an extension to TCP which facilitates hosts in using multiple paths (e.g., multiple IP addresses) to send and receive the data belonging to one connection. Various uses (e.g., simultaneous use) of these multiple paths, or sub-flows, for a TCP/IP session may improve resource usage within the network and accordingly, may improve user experience, e.g., through higher throughput and/or improved resilience (e.g., to network failure). MPTCP may operate at the transport layer, and may be transparent to both higher and lower layers. MPTCP may provide an additional set of features to an application layered over the features of standard TCP, such as illustrated in FIG. 2. A MPTCP connection may include several TCP connections that are called sub-flows. The MPTCP connection may manage creation, removal, and utilization of these sub-flows to send data. It is noted that while example application layer and MPTCP protocol stack 240 illustrates two sub-flow layers 270, 280 (and associated IP layers 290, 295), an MPTCP connection can have fewer than two, or greater than two sub-flows under various circumstances.

After an MPTCP connection has begun, additional sub-flows may be added to the connection. Hosts may have knowledge of their own IP addresses, and may become aware of the other host's IP addresses, e.g., through signaling exchanges. If other paths are available, additional TCP sessions ("sub-flows") may be created on these paths, and may be combined with the existing MPTCP session. As illustrated by example application layer and MPTCP protocol stack 240, the MPTCP layer will facilitate the MPTCP session in continuing to appear as a single connection to the applications at both ends, despite the plurality of subflows.

Some MPTCP implementations may take an input data stream from an application and split it into one or more sub-flows, with sufficient control information to allow it to be reassembled and delivered reliably, and in order, to a recipient application. For example, MPTCP may add connection-level sequence numbers to allow the reassembly of segments arriving on multiple sub-flows with differing network delays.

Some applications may store IP addresses of TCP connections. An application running on a host implementing MPTCP, that is not itself configured to run on top of the MPTCP protocol (an "MPTCP-unaware" application), may track the IP addresses of the first sub-flow only. Such applications may ignore IP addresses used by other sub-flows.

Some MPTCP implementations may maintain an MPTCP connection even if the IP address of the original sub-flow is no longer allocated to a host. In such cases, the IP address exposed to an MPTCP-unaware application may differ from the addresses actually being used by MPTCP. For example, if sub-flow 270 is created first, and later disconnected on a target host, MPTCP may be using only IP address 295, while an MPTCP-unaware application running on the target host may think it is using IP address 290. In other words, if sub-flow 270 is created first, and later disconnected on a target host, MPTCP may be using only IP address 295, while IP address 290 is still exposed to the MPTCP-unaware application running on the target host.

In some cases the de-allocated IP address may become assigned to a different host during the lifetime of the MPTCP connection. This may create a problem if the IP addresses are exchanged by applications (e.g., inside the application protocol). This problem may be addressed by enabling "fate-sharing" (i.e., considering the initial sub-flow and the MPTCP connection as a whole). Under fate-sharing approaches, if the initial sub-flow is closed, the MPTCP session may also be closed. Fate-sharing approaches may sacrifice resilience however, e.g., because under such approaches the MPTCP connection cannot close the initial sub-flow without closing the MPTCP session. MPTCP utility may be reduced if IP addresses of the first sub-flow are no longer available, e.g., due to mobility events.

Figure 3:
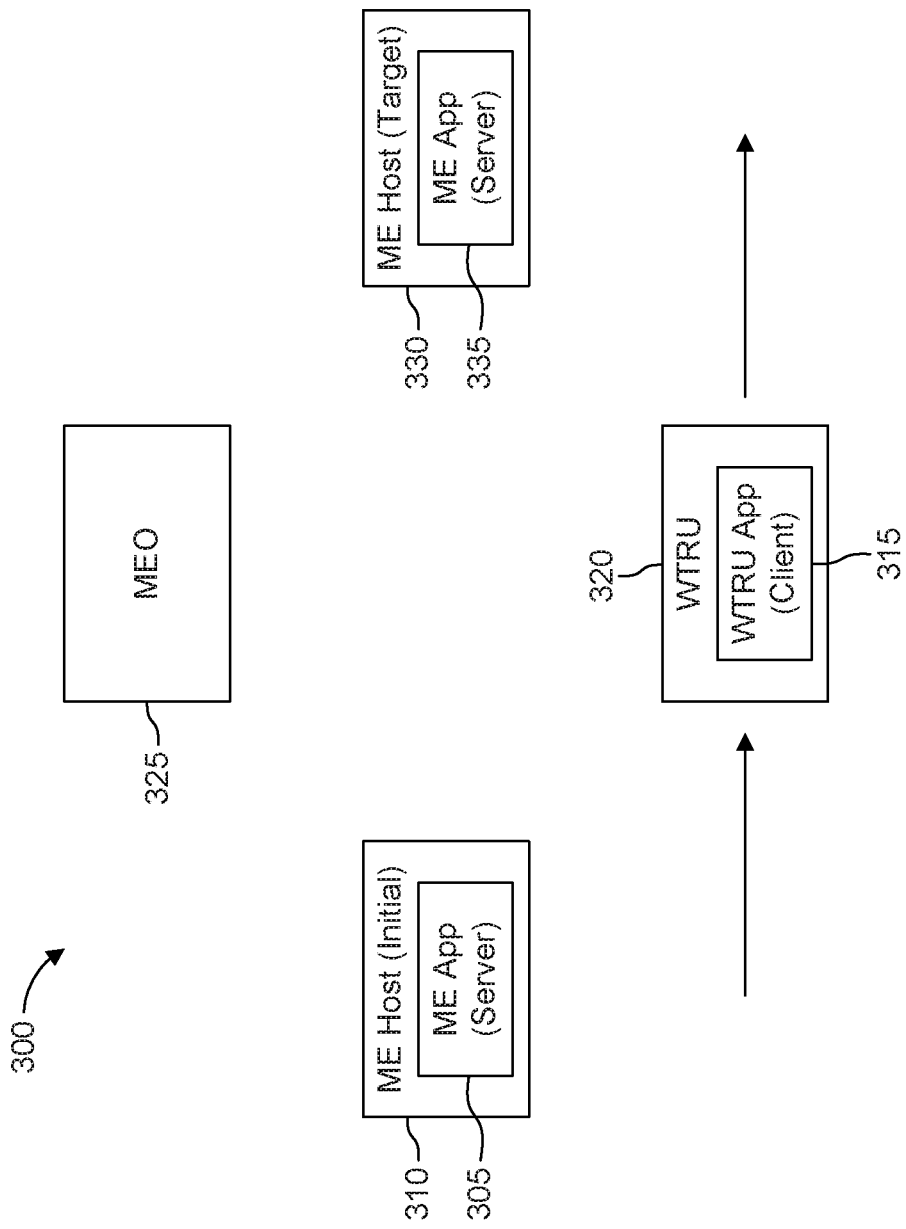
FIG. 3 block diagram illustrating a simplified example MEC topology.

FIG. 3 is a block diagram illustrating an example simplified MEC topology 300. MEC may support user mobility and associated ME App migration between mobile edge instances. MEC support for ME App migration may include: (1) ME App instance relocation (i.e. virtual machine or container), where the complete ME App is migrated (App state and executable) between MEP hosts, or (2) ME App state relocation, where a portion of the ME App state is migrated between MEC hosts. In either case, the ME App may follow the user. One benefit of moving the ME App, following the user, is to provide the shortest data path as possible consequently keeping the latency as low as possible. Additionally, fewer resources may be used in the network to service the WTRU compared to other approaches (e.g., on tunneling) to maintain session continuity.

In the example MEC topology 300 illustrated in FIG. 3, an application server (ME App 305) is running on a MEC node (mobile edge host 310). ME App 305 is a server App which is in communication with a client WTRU App 315 running on a WTRU 320. An orchestrator is used to enable application server mobility. The ME orchestrator MEO 325 (or ME platform manager (MEPM)) detects that the WTRU 320 is moving away from ME host 310 and toward ME host 330. Accordingly, MEO 325 causes the transfer of ME App 305 to target ME host 330, as ME App 335 in order for the ME App to "follow" WTRU 320 either via ME App instance migration or via ME App state relocation.

DMM pushes mobility anchors towards the edge of the network. In the MEC architecture, a Distributed Gateway (D-GW) logical entity may be placed at the edge of the network, close to the mobile node. Multiple D-GWs may exist in a DMM domain, and may anchor mobility sessions of the mobile nodes (e.g., WTRUs) attached to the domain. While the mobile node is moving and performing handover operations with different points-of-attachment and anchors, new IP addresses may be obtained by the WTRU. This may result in multiple IP addresses being allocated over the same interface. Session continuity for applications that are already running (i.e., since before a handover to a new point-of-attachment and anchor) may be handled via data tunneling between anchors. An application that is already running may keep using the same IP address, and its traffic may be tunneled to its anchor node. Newly started applications (i.e., started after the handover to the new point-of-attachment and anchor) may be associated to the newly obtained IP address (from the new anchor), which may be anchored directly at the connected anchor node. This mechanism may enable shortest data path selection for new applications that are started after the handover. Note that a WTRU's allocated IP addresses, and its associated D-GWs IP address, are saved in the core network (e.g., Home Subscriber Server (HSS) or Unified Data Management Server (UDM)) and are available to all D-GWs (i.e. anchor nodes).

A 5G Core Network may support a PDU Connectivity Service (i.e., a service that provides exchange of PDUs between a device and a data network.) A PDU Session may be associated with multiple IPv6 prefixes. Such session may be referred to as multi-homed PDU Session. The PDU Session may provide access to the Data Network (DN) via more than one PDU (IPv6) anchor. The different user plane paths leading to the IP anchors may branch out at a "common" User Plane Function (UPF) referred to as a UPF supporting "Branching Point" (BP) and/or "Uplink Classifier" (UL CL) functionality. The Branching Point and Uplink Classifier may provide forwarding of UL traffic towards the different IP anchors and merging of DL traffic to a mobile device (i.e., merging the traffic from the different IPv6 anchors on the link towards the device). Note that co-location of the UL CL or Branching Point with a PDU Session Anchor may be a deployment option.

3GPP 5G requirements may include ultra-reliable and low-latency communications (URLLC). Use cases of URLLC may include, but are not limited to, autonomous vehicles that perform cooperation and safety functions, monitoring and control of smart grids, tactile feedback for remote medical procedures, control and coordination of unmanned aviation vehicles, robotics, industrial automation, and so forth. These use cases may require interactions which have specific latency tolerances. For example, such use case may require interactions with a latency below a particular threshold, which may be referred to, e.g., as low latency interactions, or very low latency interactions. Such actions may not be able to tolerate traffic directed to a distant or "far away" host where latency exceeding the threshold would be introduced, such as using some types of tunneling approaches.

In some implementations, such use cases may be addressed with enhanced MPTCP approaches, e.g., enabling fast application mobility.

MEC supports application mobility allowing an application server to "follow" a mobile device as it is moving and connecting to different access points and/or access networks, such as in DMM as discussed above. For example, MEC may support moving an ME App from one ME host to another as discussed above. Moving the ME App to follow the user may have the advantage of providing the shortest (or a suitably short) data path, e.g., in an attempt to keep latency as low as possible.

In an example scenario, a WTRU may connect to another PoA/anchor node and obtain a new IP address from a currently connected anchor while preserving its previously assigned IP addresses. Obtaining a new IP address from the currently connected anchor may have the advantage of enabling a shortest (or suitably short) data path, e.g., since no mobility management handling (e.g., tunneling) may be needed when the new IP address is used. However, the data path to the WTRU also depends on the location and/or anchoring of the correspondent node (i.e., the node communicating over the data path with the WTRU). For example, in a first case where a WTRU moves away (e.g., to a different anchor) from a ME App (peer) that remains at the same location (e.g., on a particular ME host), the data path between a client app on the WTRU and the ME App may be relatively longer than a second case where the ME App moves to follow the WTRU (e.g., is transferred to a ME host closer to the WTRU). In the second case, the data path may be shorter assuming the new IP address is used. To address this aspect of the data path, ME App mobility may be implemented to enable moving the correspondent node closer to the WTRU, and to its anchor node.

Since ME App mobility may be useful in addressing 5G use cases, it is noted that MEC assumes that the underlying network maintains connectivity between the mobile device and the edge application server as the edge application server transitions across ME hosts. Connectivity, as discussed herein, may refer to a TCP session established between a client application running on the WTRU and an application server running on the network side (e.g., on an ME host). The TCP session (bound to a specific IP address pertaining to a specific network node) may need to be maintained to preserve connectivity.

Various connectivity problems may be encountered if an application server (or ME App) running on an ME host is moved to another ME host. ME App mobility may be handled differently depending on the situation, from the connectivity standpoint.

Some ME mobility solutions may include employing Break-Before-Make using DNS redirection. In some examples, a ME App closes the TCP connection with its peer (i.e., a WTRU App) before moving to a new ME host. No application data is exchanged from this point between the WTRU App and ME App. The WTRU App performs a DNS lookup specifying the ME App URL, after which, the WTRU App may be redirected via DNS redirection to the new ME host. A new TCP connection is established with the ME App now running on the new ME host, after which, application data transfer between the WTRU App and ME App may resume. In such Break-Before-Make solutions, the ME App follows the WTRU as desired; however, Break-Before-Make approaches may result in connectivity being lost for a certain time. Such connectivity loss may not be acceptable for applications with certain latency requirements (e.g., low-latency applications).

Some ME mobility solutions may include employing Break-Before-Make without DNS redirection. In some examples, a ME App closes the TCP connection before moving to the new ME host. No application data is exchanged from this point between WTRU App and ME App. The WTRU App performs a DNS lookup specifying the ME App URL, but the DNS lookup may not be redirected right away e.g., because the ME Host App URL is often cached on the WTRU. Consequently, the WTRU App establishes a new TCP connection with the ME App at its initial location. Such reconnection may cause several issues. One example issue that may arise is that connectivity may be lost for a certain time, which may not be acceptable for applications with certain latency requirements (e.g., low-latency applications). Another example issue that may arise is that the ME App may still be running on the initial ME host, but the WTRU App session has already been transferred; thus application data transfer may not continue with the WTRU App from the point where the TCP connection was closed. One example issue that may arise is that the ME App may no longer be running on the initial ME host, and thus, communications may not be reestablished with the WTRU App.

Some ME mobility solutions may include Break-Before-Make using application-specific communication. In some examples, a ME App may inform WTRU App, e.g., via application-specific communication, that it will move or has moved to a new ME host. The IP address of this new ME host may be specified, and the WTRU App may close the initial TCP connection and establish a new TCP connection toward the new ME host. The WTRU App may not issue a DNS lookup, e.g., since information for reaching the new ME host (i.e., the new IP address) may be provided by the ME App via proprietary signaling (e.g., at the application level). In such solutions, connectivity being lost for a certain time. Such connectivity loss may not be acceptable for applications with certain latency requirements (e.g., low-latency applications). Such solutions involve participation of the WTRU App in the ME App mobility, which may not be desired, in that it may require all apps supporting ME App mobility to be updated to support the ME App mobility.

Some ME mobility solutions may include employing Break-Before-Make using an ME orchestrator (e.g., an MEO, MEPM, and/or MEP). In some examples, the orchestrator may inform the WTRU App that the ME App will move or has moved to a new ME host. The Orchestrator may communicate the new ME host IP address to the WTRU App, after which the WTRU App may close its initial TCP connection and establish a new TCP connection toward the new ME host. The WTRU App may not issue a DNS lookup, e.g., because information for reach the new ME host (i.e., the new IP address) is provided by the Orchestrator. In such solutions, connectivity being lost for a certain time. Such connectivity loss may not be acceptable for applications with certain latency requirements (e.g., low-latency applications).

Some ME mobility solutions may employ Make-Before-Break using application-specific communication or orchestrator communication. In some examples, the ME App or orchestrator may inform the WTRU App that it will move or has moved to a new ME host, after which the WTRU App may establish a new TCP connection toward the new ME host with the ME App, in addition to the existing TCP connection with the ME App running on the initial ME host. The ME App or orchestrator may inform the WTRU App of when it is ready to receive data at its new location (i.e., the new ME host), at or after which time the WTRU App and ME App may begin using the new TCP connection for data transfer and the WTRU App may close the initial TCP connection. Such solutions involve the participation of the WTRU App in the ME App mobility, which may not be desired, in that it may require all apps supporting ME App mobility to be updated to support the ME App mobility. Further, the initial ME App and the new ME App may need to be synchronized when the new TCP connection usage starts (i.e., 2 ME App applications are running at the same time). For example, a sequence number may need to be synchronized. Such synchronization issues may impose new requirements on the ME App side, e.g., requiring further updates to such ME Apps.

Some ME mobility solutions may include employing session continuity obtained via tunneling. In some examples, the ME App may be moved to a new ME host, and the mobility support service running on the ME hosts may set up a tunnel between the initial and target ME hosts, allowing the preservation of the TCP connection. The WTRU App may not be aware of the ME App relocation and may continue to send traffic over the TCP connection with the initial ME host. The initial ME host acts as a branching point or serving node, redirecting UL traffic from WTRU to new ME host and DL traffic from new ME host toward WTRU. A tunnel (e.g., PMIP or GTP) may be used between the initial ME host and the new ME host for this purpose. Such solutions may preserve the TCP connection without data transfer interruption, however, latency may be increased, e.g., due to the tunneling requiring encapsulation of data packets and resulting in a longer data path. Such increased latency may not be acceptable for applications with certain latency requirements (e.g., low-latency applications). This may conflict with some purposes of moving the ME App toward the WTRU, e.g., to maintain as short a data path as possible, and keeping latency as low as possible.

Some ME mobility solutions may include employing a middlebox to handle connectivity between the WTRU and the ME App server. In some implementations, a middlebox is a device which transforms, inspects, filters, or otherwise manipulates data packets or other traffic for purposes other than packet forwarding. The middlebox may be used to isolate the WTRU App from the ME App mobility events however, maintaining connectivity may be problematic. For example, the middlebox may need to establish a new TCP connection with the ME App on the new ME host and associate this new connection with the WTRU App's existing session. Such procedures may introduce delay, which may not be acceptable for applications with certain latency requirements (e.g., low-latency applications) and/or may not meet latency requirements for 5G use cases.

As in the situations discussed above, by moving the ME App onto another ME host, an existing TCP session may no longer be used to reach the ME App (except in tunneling situations) since the IP address associated with the existing TCP session is still addressing the initial ME host. Accordingly, connectivity may be lost until a new TCP session is established between the client application (or middlebox) and the ME App on the new ME host, introducing delay and/or latency not acceptable for applications with certain latency requirements (e.g., low-latency applications)

Applications that require limited latency interactions (e.g., very low latency interactions), and applications which require TCP session continuity (e.g., for long-running sockets) may be unable to tolerate delays or latency associated with DNS redirection, TCP connection timeout, and/or TCP connection re-establishment.

Figure 4A:
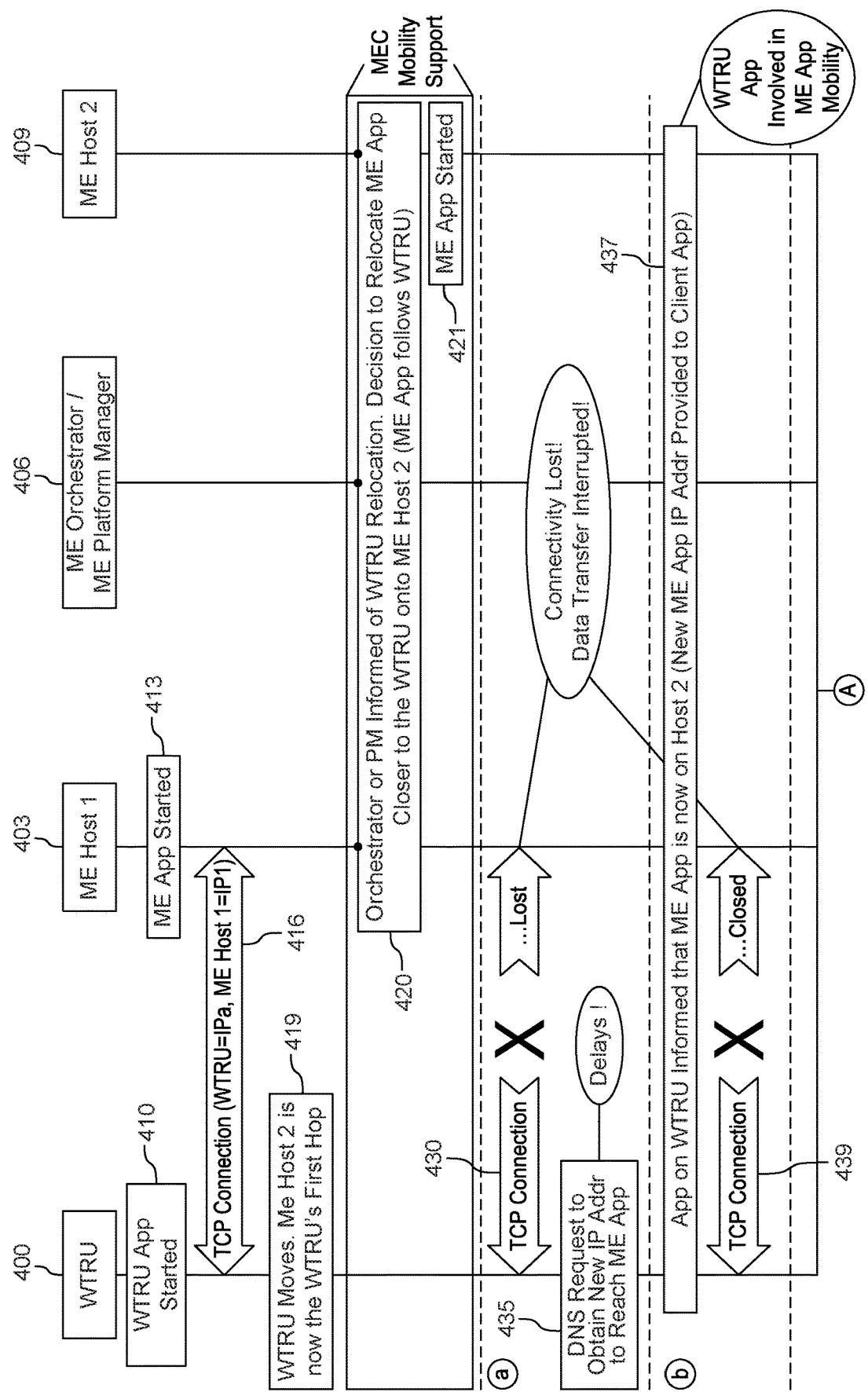
FIG. 4A is a message sequence chart illustrating an example situation where connectivity is lost during ME App mobility in a network.
Figure 4B:
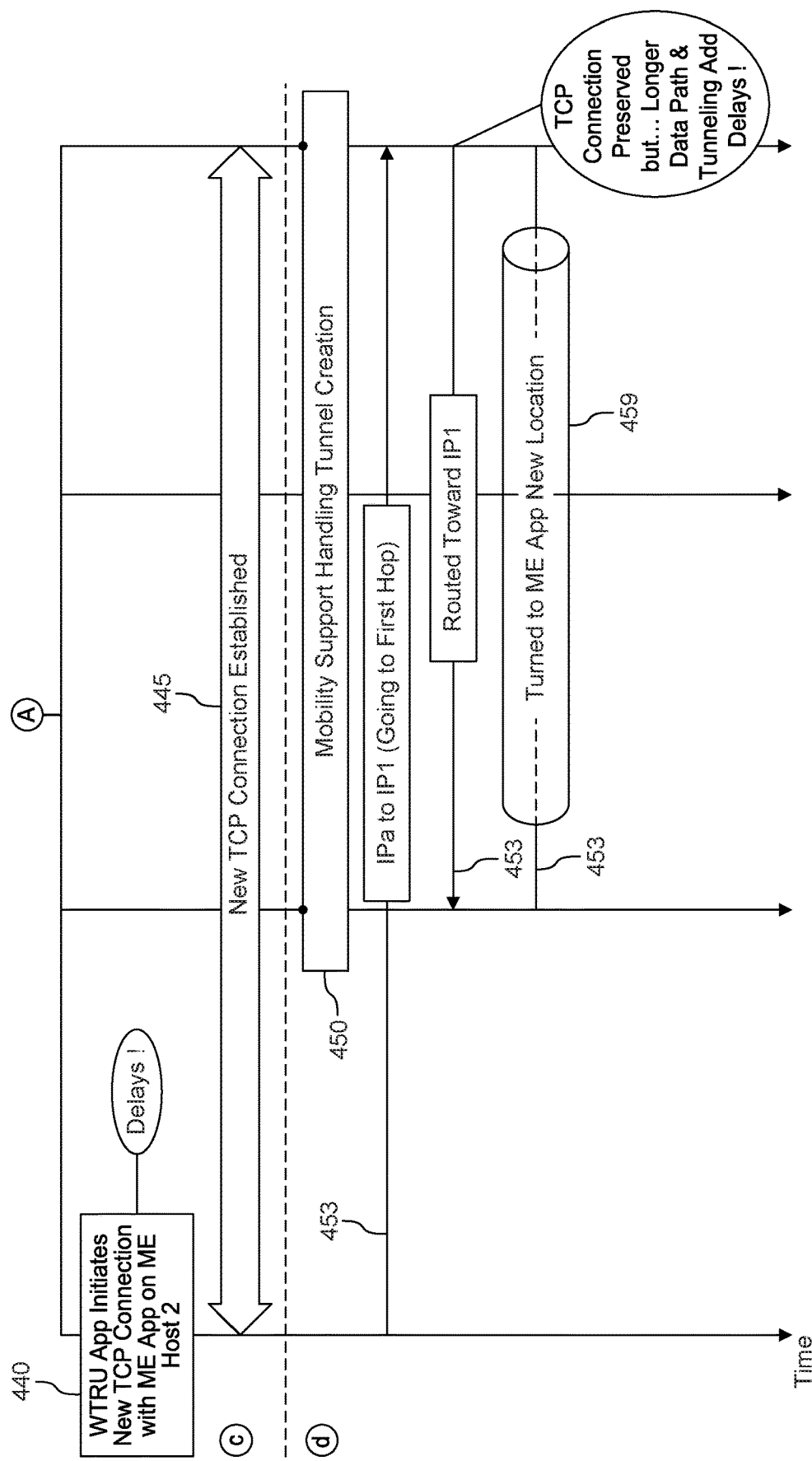
FIG. 4B is a message sequence chart continuing the illustration of an example situation where connectivity is lost during ME App mobility in a network from FIG. 4A.

FIG. 4 is a message sequence chart illustrating example signaling among a WTRU 400, a first ME host 403, an ME orchestrator, MEO 406 (or ME platform manager, MEPM), and a second ME host 409 for an example situation where connectivity is lost during ME App mobility in a network. In this example, a WTRU App 410 is started on WTRU 400, and a ME App 413 is started on ME host 403. A first TCP connection 416 is made between WTRU App 410 and ME App 413. At operation 419, the WTRU 400 moves (e.g., in space). MEC ME App mobility may be used to facilitate the ME App to "follow" WTRU 400 (i.e., to relocate, or otherwise to be executed on a different ME host closer to the new location of WTRU 400). Here, MEO 406 detects (e.g., as discussed above) that WTRU 400 is moving in step 420, and triggers a transfer of ME App to a new ME host 409 as ME App 421. After step 420, the ME App running (or previously running) on ME host 403 is now running on ME host 409 as ME App 421.

MEC may assume that connectivity is maintained, e.g., as described in the following examples. Example cases (a), (b), (c), and (d) each occur after the start of the ME App 421 on ME host 409. In the first example case (a), the TCP connection with the ME App at ME host 403 may be lost or closed at operation 430, e.g., as a result of the ME App moving to ME host 409. In case (a), the WTRU App 410 may detect the loss of the TCP connection with the ME App at ME host 403 and may perform a DNS query in operation 435 to obtain the IP address of the ME App as relocated to ME host 409. It is noted that the DNS query in operation 435 may add delays to the connectivity re-establishment time.

In an alternative case (b), the WTRU App 410 executing on WTRU 400 may be informed (e.g., by MEO 406 or the ME App executing on ME host 403) in step 437 to continue the data transfer with the ME App 421 running on the new ME host 409. A new IP address to reach the ME App 421 executing on ME host 409 may be provided to the WTRU App 410, e.g., by MEO 406 or the ME App executing on ME host 403. Such participation of the WTRU App 410 in the ME App transfer may have various issues however, as discussed earlier. The TCP connection with the ME App at ME host 403 may be lost or closed at operation 439.

In example case (c) (following either case (a) or case (b)), the WTRU 400 initiates a new TCP session 445 with ME host 409 in operation 440. The connectivity is lost and data transfer is interrupted until the new TCP connection is established with ME host 409.

In example case (d), ME App mobility support may be handled using tunneling between the initial ME host 403 and the target ME host 409 in operation 450. In this example, the WTRU 410 has moved to ME host 409 in operation 419, however the TCP connection between the WTRU App and the ME App executing on ME host 403 may be preserved by establishing a tunnel 459 between ME host 409 and ME host 403. Here, for example, UL data 453 from WTRU 400 directed to the IP address of the ME App executing on ME host 403 is first transmitted to ME host 409 (assuming ME host 409 is the first hop of the WTRU), and is forwarded to ME host 403 via usual IP routing. ME host 403 then tunnels UL data 453 to ME host 409 via tunnel 459. Maintaining TCP connectivity in this manner may require that the data always travel via initial ME host, making the data path longer and increasing delays/latency. Such solutions may preserve the TCP connection without data transfer interruption, however, latency may be increased, e.g., due to the tunneling requiring encapsulation and de-encapsulation of data packets and resulting in a longer data path. Such increased latency may not be acceptable for applications with certain latency requirements (e.g., low-latency applications). This may conflict with some purposes of moving the ME App toward the WTRU, e.g., to maintain as short a data path as possible, and keeping latency as low as possible It may be desired to preserve connectivity between a client App (e.g., WTRU App) and an ME App as the ME App (instance or state) transitions across ME hosts while also meeting latency requirements, such as a maximum latency threshold (e.g., of 5G or another use case), which may be referred to as "low latency". Here, a ME App transition may include creating a new instance of an ME App on a target ME host and configuring the new instance with the state of a currently running ME App on the initial ME host. In some cases, the ME App may already be running on the target ME host; in such cases, the ME App may not need to be re-instantiated, but can be reconfigured with the state of the currently running ME App on the initial ME host. It may also be desired to establish a direct connection between a WTRU App and an ME App at its new location (ME host) without the participation of the WTRU App in the ME App mobility operation.

Accordingly, the MPTCP protocol may be used for the WTRU and ME hosts to preserve connectivity and meet latency requirements, without certain participation of the WTRU App in the ME App mobility operation. MPTCP sessions group multiple TCP sessions under the umbrella of a single MPTCP session (i.e., using the concept of sub-flows), transparently to (e.g., without the participation of) the application. In such implementations, the MPTCP session may appear as a regular TCP session to the application. ME App transfer may thus be supported using an MPTCP session by allowing the creation of an additional MPTCP sub-flow (i.e., another TCP session) toward the new ME App instance (on the new or "target" ME host) and allowing redirection of the traffic onto this new connection once the ME App transfer is completed. In this way, the data transfer may be uninterrupted, latency may not be increased, and the application transfer may be transparent to the client application, which continues to transmit data to the same connection (i.e., the TCP connection). By intercepting the regular TCP session from the application, the MPTCP stack allows the application to continue its TCP session as though it were using the same TCP connection, even if the MPTCP sub-flows (themselves TCP connections) are changed beneath the MPTCP layer. In some implementations, the target ME host may be selected (e.g., by the MEO or MEPM) before triggering the ME App transfer and MPTCP session transfer.

In some embodiments, MPTCP may be implemented on the WTRU (or an MPTCP proxy on a middlebox) and ME hosts to overcome various connectivity problems, such as those discussed above. However, such approaches may contribute to other issues. For example, MEC may expect ME App transfer to be handled by the MEO or MEPM (e.g., where the ME Application instance is moved to the new ME host or the ME Application's state is transferred to the new ME host), however, the MEO (or MEPM, or MEP) may not be aware of whether the ME Application is TCP-based and whether MPTCP was used on the previous ME host. Also, when MPTCP is used, the orchestrator or PM may not be aware of which MPTCP session was used and should be transferred to the new ME host. Further, it may be necessary to modify MPTCP to support MPTCP session transfer.

Accordingly, ME App mobility approaches may focus on ME App relocation, whereas MPTCP approaches may be transparent to applications. The MPTCP stack may create an MPTCP session using one or more sub-flows (i.e., TCP sessions), where the application may not be aware of this MPTCP session and sub-flows creation/usage. Accordingly, in some implementations, MPTCP stack transfer (which may be required for the MPTCP stack to "follow" the ME App), is not handled by the ME application itself. In some cases, where the ME App is MPTCP-aware in some sense (e.g., the ME App knows that MPTCP is running and can configure the MPTCP stack via an API to control some of its behaviors), the ME App may not be aware of MPTCP stack internals. Accordingly, in some implementations MPTCP stack transfer is likewise not handled by MPTCP-aware ME Applications. In some cases, the orchestrator may not be aware of whether the ME App implements MPTCP. Accordingly, the orchestrator may need to be informed of whether the ME host is using MPTCP and whether the ME App is TCP-based so that the MPTCP stack may be moved, with the ME App, to the new ME host.

MPTCP may need to support the transfer of an existing MPTCP session to a new MPTCP stack instance and the adaption of this MPTCP session to a new host. Said another way, an MPTCP stack may need to be configured or started with information about an existing MPTCP session. An MPTCP session may need to be transitioned from an ME host to another ME host while maintaining connectivity with the WTRU peer and preserving the socket information linking the MPTCP stack with the associated ME App. Adapting the target MPTCP stack may include adapting the MPTCP session number to other existing MPTCP sessions (e.g., such that the session number of the target MPTCP session does not duplicate a session number already in use by another MPTCP session).

Transfer of the MPTCP session, and related information, (e.g., including a session identifier, associated peer's IP address, security keys, sequence numbers, and the like) may also need to be supported.

Accordingly, in some implementations, an API may be used to enable another application (e.g., MEO/MEPM/MEP) to obtain or set the MPTCP stack session information details which may be needed to support mobility cases where the ME App "follows" the WTRU (i.e., to a new ME host). In some implementations, direct communication may be provided between two MPTCP server instances, allowing MPTCP session transfers. In some implementations, MPTCP may be modified such that MPTCP sessions may involve more than two peers (i.e., may involve sub-flows with different peers associated with the same MPTCP session). In some implementations, a socket descriptor may be transferred to a new host and may be adapted to existing sockets.

Certain latency targets (e.g., a latency below a desired threshold, or "very low latency") may be required in 5G networks for some Applications. In some implementations, transferring an application server (or network application) to follow its users (e.g., a WTRU moving away from one ME host and closer to another ME host) while maintaining session continuity may enable meeting such requirements.

Some embodiments provide MPTCP session mobility, allowing an ME Application to be moved to another ME host while preserving connectivity between the ME Application and its corresponding client application (e.g., executing on a WTRU), and keeping latency low. In some implementations, ME Application mobility allows an application server (e.g., running on a ME host) to be kept close (e.g., physically) to a mobile device (e.g., WTRU), enabling the usage of the shortest data path in the network. Such mobility, used with TCP session preservation of a WTRU application obtained using enhanced-MPTCP (e.g., as discussed herein) may reduce or minimize latency.

In some embodiments, MPTCP session transfer adds little or no delay to an application relocation procedure. For example, a ME Application may pause data transmission while relocating to a target ME host, and then resume data transmission after the relocation is completed. After the ME App relocation is completed, in some implementations, an enhanced-MPTCP has already completed moving the MPTCP session. Accordingly, the application data may immediately be exchanged between the corresponding WTRU App and ME App executing on the target ME host. In some implementations, MPTCP session transfer may shorten the overall time required for the ME App relocation and data transfer continuation, e.g., as further discussed herein.

In some embodiments, MPTCP may address various connectivity issues. For example, MPTCP may be used to assist in maintaining session continuity between a WTRU App and a ME App during and after the ME App transfer to a new ME host. Such MPTCP-facilitated ME App transfer and subsequent connectivity may be transparent to the WTRU App. In some implementations, ME App transfer and/or connectivity support may not require participation by the WTRU App, although in some implementations, the MPTCP stack running on the WTRU may be involved.

In some embodiments, MPTCP sessions may be mobile, where an MPTCP session with an initial ME host (i.e., a session between a WTRU and an initial ME host) may be moved to a target ME host (i.e. such that the MPTCP session is between the WTRU and the target host). Various approaches to such MPTCP session mobility are possible. In such approaches, the MPTCP stack running on the WTRU may be modified as discussed herein.

In some embodiments, a third party application (e.g., an orchestrator) may use one or more APIs provided locally on the ME host to obtain an MPTCP configuration and to configure a target MPTCP instance (i.e., on a target ME host) with an existing MPTCP session (i.e., on the initial ME host).

In some embodiments, a new MPTCP message may be used to facilitate MPTCP session transfer using intercommunication between MPTCP instances. In such cases certain MPTCP instances may be "special" MPTCP peers. In such cases, an application communication path may not be created and no application data traffic may be exchanged between special MPTCP peers—rather, MPTCP specific information is exchanged between the MPTCP instances. Typical (i.e., non-special) MPTCP peers may include, for example, application having "client-server" roles. Such applications may run on top of the MPTCP stack which handles the transport of the application's traffic. Using various approaches herein however, traffic may include server-server communication for MPTCP transfer, where the traffic is transparent to the "client" peer.

In some embodiments, MPTCP sessions may have more than two active MPTCP peers (e.g., may include a WTRU, current ME host, and target ME host). Accordingly, in some embodiments, sub-flows may be created between an MPTCP session and more than one different peer. Such communication among multiple peers may be transparent to the WTRU MPTCP stack, and in some implementations may be enabled by using the same security keys on both peers (e.g., on both ME hosts—initial and target). In some embodiments the MPTCP stack may be adapted to a new ME host environment. For example, the MPTCP stack may be adapted transparently to an MPTCP session user (e.g., an ME App), which may continue to use the same socket number to send and receive data to and from a WTRU App. In some embodiments, an MPTCP session may be preserved even if its initial sub-flow is disconnected or otherwise unavailable. This may have the advantage of obviating fate-sharing solutions, which may break connectivity and add delay.

It is noted that while various embodiments are described herein with respect to specific types of networks for the sake of convenience and ease of description, none of the embodiments discussed herein are restricted to a specific type of network, and may be employed in the context of any suitable communications system.

Table 1 shows a comparison of a TCP-based approach to an example application relocation of a ME App from an initial ME host to a target ME host, with an enhanced-MPTCP-based approach to the same relocation, at various steps of the relocation. For each approach, the statements marked (−) emphasize stages where application data may not be exchanged, and statements marked (+) emphasize stages where application data may be exchanged.

TABLE 1

| steps | TCP-based Approach | Enhanced-MPTCP Approach |
|---|---|---|
| 1. WTRU moves | Session continuity supported in the network. Data exchanged between ME App (host 1) and WTRU App. | Session continuity supported in the network. Data exchanged between ME App (host 1) and WTRU App. |
| 2. Decision to move ME App (from host 1 to host 2) | (−) Application data transfer paused. TCP connection closed. | MPTCP session relocation started. New sub-flow between host 2-WTRU created prior to ME App relocation. (+) Data continues to be exchanged between ME App (host 1) and WTRU App. |
| 3. ME App relocation started | ME App relocation started. (−) Data transfer still paused. | (−) Application data transfer paused. ME App relocation ongoing - at the same time - MPTCP session relocation is completed. New sub-flow ready to be used. This step takes as much time as needed for ME App transfer. |
| 4. ME App relocation completed | ME App on host 2 ready to resume data transfer with WTRU App however TCP connection needs to be re-established. TCP connection re-establishment. (−) Data transfer still paused. | (+) ME App on host 2 resumes data transfer with WTRU App. Direct WTRU App-ME App on host 2 communication (session continuity not involved anymore) |
| 5. TCP connection re-established | (+) ME App on host 2 resumes data transfer with WTRU App. | |

Figure 5A:
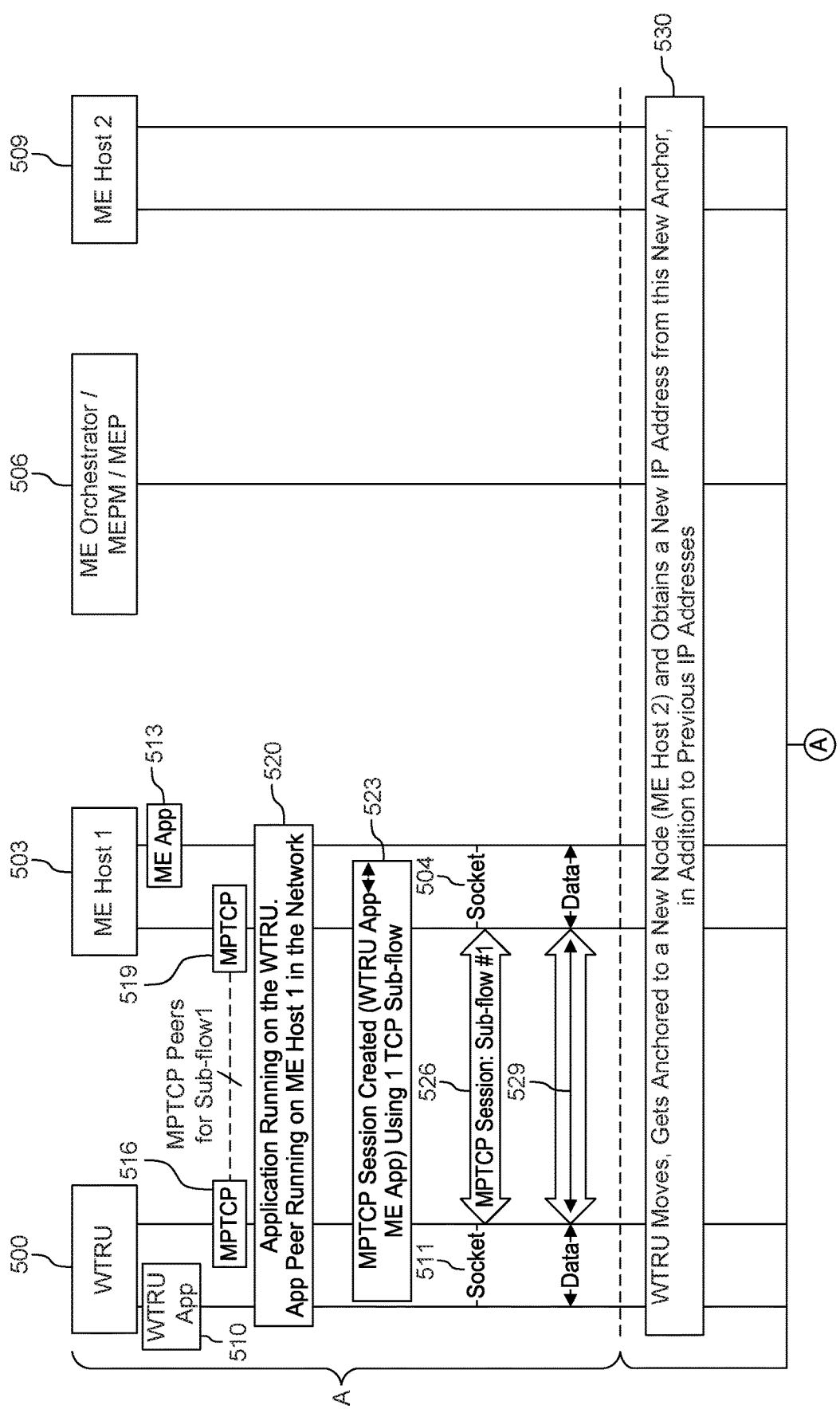
FIG. 5A is a message sequence chart illustrating an example global view of an MPTCP stack mobility approach.
Figure 5B:
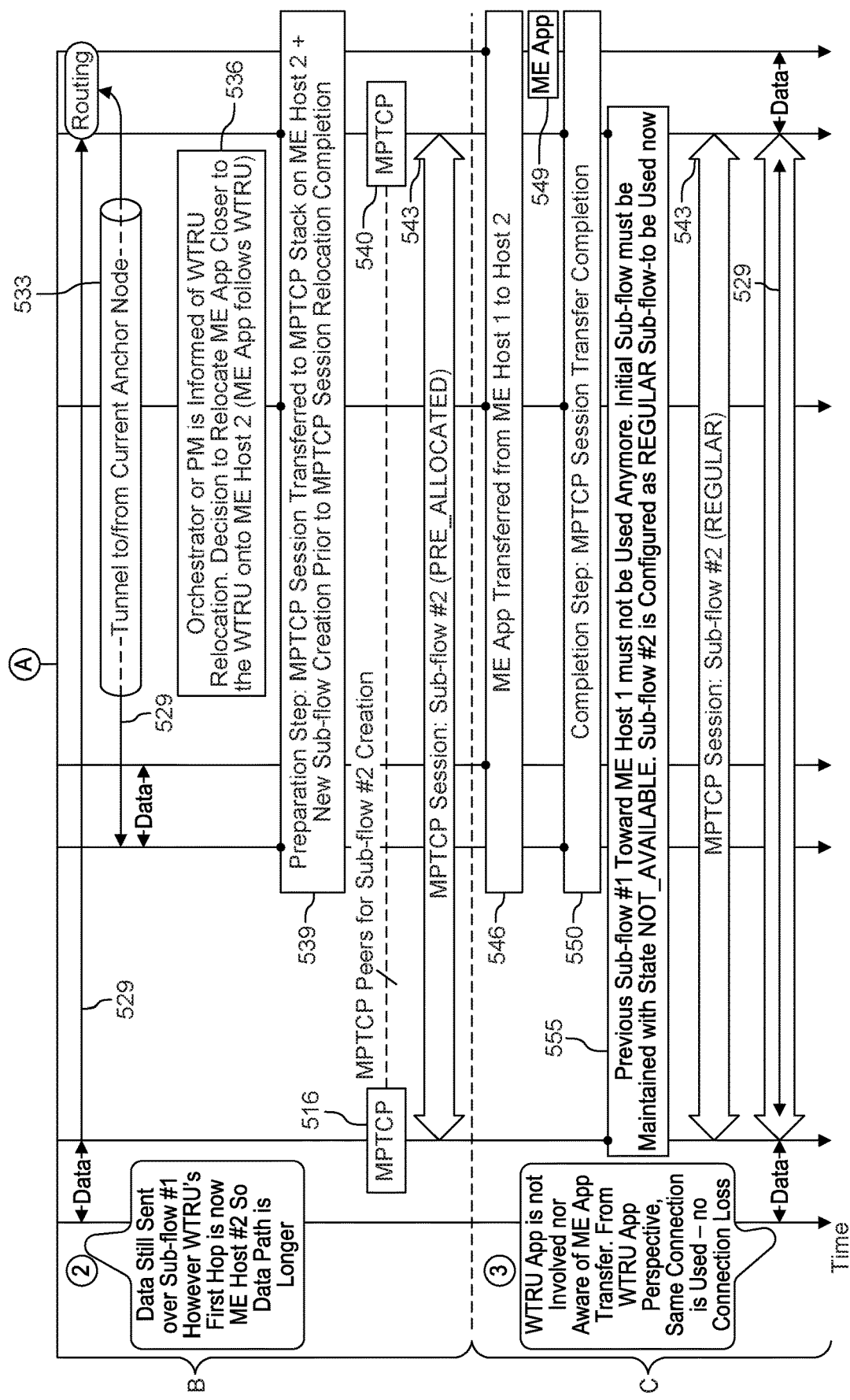
FIG. 5B is a message sequence chart continuing the illustration of an example global view of an MPTCP stack mobility approach from FIG. 5A.

FIG. 5 is a message sequence chart illustrating example communications among a WTRU 500, a first ME host 503, an MEO 506 (or MEPM), and a second ME host 509, for an example situation where ME App mobility is managed using an enhanced MPTCP approach. This example implements MPTCP stack mobility, where an ME App and MPTCP session is transferred to a new ME host.

As exemplified in FIG. 5, MPTCP may be used on a device and on the application server node to support the application server mobility. This support may involve more than creation of a new MPTCP sub-flow/path. Rather, a new MPTCP instance which may be instantiated (or a current MPTCP instance which may continue execution) with a MPTCP session that is already active, is adapted to a new ME host and makes use of a new sub-flow.

As used herein, "orchestrator" may be considered to be a generic term that represents the ME Platform Manager (MEPM) or ME Platform (MEP) entities. As discussed herein, and shown in the figures, the ME orchestrator, MEPM, and sometimes MEP may be specified in the same box for simplicity, however, the corresponding architecture shown and described with respect to FIG. 3 may be used, for example. In such cases, an entity directly interacting with the MPTCP stack via socket APIs may be running on the same ME host, and thus may be assumed to be the MEP entity. In such cases, interactions among the MEP, MEPM and MEO may communicate the information to the MPTCP instance running on the target ME host.

The message sequence chart of FIG. 5 is shown and described in three sections, A, B, and C. Section A describes operations prior to movement of WTRU 500, Section B describes MPTCP session transfer preparation operations after WTRU 500 begins to move, and section C describes MPTCP session transfer completion operations relating to ME App transfer.

In section A of FIG. 5, WTRU 500 begins running a WTRU App 510 which is (or will be) in communication 520 with a network-based App running at the edge of the network (i.e., ME App 513 on ME host 503). MPTCP stack 516 is running on WTRU 500 and MPTCP stack 519 is running on ME host 503, where MPTCP stack 516 and MPTCP stack 519 are MPTCP peers. MPTCP may be transparent to the Apps, however, in some implementations, MPTCP-aware Apps may be used on either device. WTRU App 510 may use socket interface 511 to create a TCP session, and MPTCP stack 516 intercepts this socket request. Accordingly, an MPTCP session 523 is created and a TCP sub-flow 526, handling transfer of data traffic 529, is created between the two MPTCP stacks 516 and 519. Many sub-flows may be created between WTRU 500 and ME host 503, depending of the number of interfaces used on the WTRU 500 and ME host 503 host, and the number of IP addresses assigned on each of them. For simplicity, only one sub-flow is illustrated in FIG. 5.

Regarding section B, the WTRU 500 moves, instigating a handover 530. During handover 530, WTRU 500 attaches to another PoA and becomes anchored to another anchor node in the network, where the network supports session continuity as discussed herein. The WTRU obtains a new IP address from the new anchor, while still preserving the IP address already in use and associated with sub-flow 526.

After handover 530, the data path for sub-flow 526 is longer than prior to handover 530, because after handover 530 the data traffic 529 is forwarded from WTRU 500 to ME host 503 via ME host 509. In this example, data traffic 529 is tunneled between the two anchors; i.e., between currently connected ME host 509 and previously connected ME host 503, via tunnel 533. In step 536, MEO 506 is notified (e.g., by the network. For example, the MEO 506 may register with the network to be notified when the WTRU moves/does handover to another PoA/anchor) of the movement of WTRU 500, and determines that the ME App 513 should be moved to another ME host to "follow" (i.e., be physically closer to) the WTRU.

ME App mobility may be used to enable maintenance of the shortest data path between the WTRU App 510 and the ME App 513, e.g., to obtain better data transfer performance. Additionally, fewer resources may be used in the network to service the WTRU compared to other approaches, such as those that are based on tunneling to maintain session continuity.

In step 539, to prepare the ME App transfer and preserve the connectivity, the orchestrator triggers MPTCP session transfer preparation. During step 539, information (e.g., security keys, tokens, sequence number, etc.) is transferred to a target MPTCP stack 540 running on target ME host 509 to enable the creation of a new sub-flow 543, associated with the existing MPTCP session 523 on WTRU 500 (i.e., MPTCP stack 516), prior to transfer of ME App 513 and completion of the transfer of MPTCP session 523. New sub-flow 543 is "pre-allocated" (e.g., may be created with a priority PRE_ALLOCATED) and is not used for data traffic transfer at this point. Advance creation of sub-flow 543 with the target ME host 509 in this way may facilitate data transfer between the target ME host 509 and WTRU 500 as soon as possible after the ME App and MPTCP session relocation are completed, without interrupting data traffic between WTRU App 510 and the ME App.

The IP address of WTRU 500 used by the MPTCP stack 540 on ME host 509 for sub-flow 543 creation may be the IP address allocated by the current anchor node during handover 530. In this example, the anchor nodes have access to the WTRU's connectivity information, as discussed earlier regarding DMM. The connectivity information may be made available to MEO 506, e.g., to configure the MPTCP stack 540. The IP address allocated to WTRU 500 by the current anchor node may be provided to MPTCP stack 540 as part of the MPTCP session transfer procedure.

Sub-flow 543 may be created using MPTCP messages exchanged between MPTCP stack 516 and MPTCP stack 540. MPTCP stack mobility may be transparent to MPTCP stack 516. Accordingly, MPTCP stack 516 may be unware that it is communicating with MPTCP stack 540 instead of communicating with MPTCP stack 519.

At the end of section B, data traffic 529 is transferred between WTRU App 510 and ME App 513 using sub-flow 526; however, the data path is now much longer than prior to handover 530. This is because the WTRU's "first hop" or entry point in the network, is now ME host 509, and accordingly, data traffic 529 must travel from WTRU 500 through ME host 509 and then be routed as usual toward its destination (in this case, ME App 513 running on ME host 503). The same path is used in the DL direction. Various aspects of preparation steps such as step 539 are further described herein.

Regarding section C, in step 546, MEO 506 triggers the transfer of ME App 513 to ME host 509 (where the transferred ME App is referred to as ME App 549). In step 550, MEO 506 triggers the completion of the MPTCP session transfer from MPTCP stack 519 to MPTCP stack 540. After completion of the session transfer, in step 550, MPTCP stack 540 on ME host 509 changes sub-flow 543 to a regular state from the pre-allocated state (e.g., changing a priority to "REGULAR" from "PRE_ALLOCATED"). MPTCP stack 540 also (e.g., using the same MPTCP message) changes sub-flow 526 to an unavailable state (e.g., changes a priority to NOT_AVAILABLE). In this example, changing sub-flow 526 to an unavailable state triggers the use of sub-flow 543 for data traffic 529 between WTRU App 510 and relocated ME App 549. It is noted that sub-flow 526 and sub-flow 543 cannot both transfer data at the same time (i.e., cannot both be in a regular state at the same time), however, the initial sub-flow 526 may be preserved (e.g., in an unavailable state).

On the initial ME host 503, only the initial sub-flow 526 is maintained, set as unavailable (e.g., with a priority set to NOT_AVAILABLE). Other sub-flows from ME host 503, if any, are closed. For example, if a redundant or backup (e.g., having a priority "BACKUP") sub-flow (not shown) was configured between WTRU 500 and ME host 503 (i.e., to backup or provide redundancy for sub-flow 526) then this sub-flow is closed before changing sub-flow 543 to the regular state.

In the example of FIG. 5, the initial sub-flow 526 may be maintained, even though it may not be used for data transfer, e.g., to support applications on the WTRU which have associated the IP address of this initial sub-flow to a session or application. Accordingly, to preserve the MPTCP session and avoid fate-sharing behavior, the initial sub-flow 526 may be preserved, and its associated IP address may remain assigned to the WTRU until the MPTCP session is closed. In the eventuality that preserving the initial sub-flow 526 is no longer required, then sub-flow 526 may be closed, rather than maintaining it in an unavailable state or otherwise changing its state.

After completion of section C, WTRU App 510 may continue to send and receive data traffic 529 as usual, without being aware of the new data path or ME App relocation, and MPTCP session transfer may be considered to be complete. Various further details of the completion, and other aspects of the example of FIG. 5, are described further herein.

It is noted that MPTCP session relocation is performed only for those MPTCP sessions used by the ME App 513 that is moved (i.e., to ME Host 509 as ME App 549). Any other MPTCP sessions (not shown) handled by the MPTCP stack 519 on ME host 503 are not impacted by the move and relocation. It is noted however that multiple MPTCP sessions may be moved at the same time, following the same procedure as described for a single MPTCP session.

Figure 6:
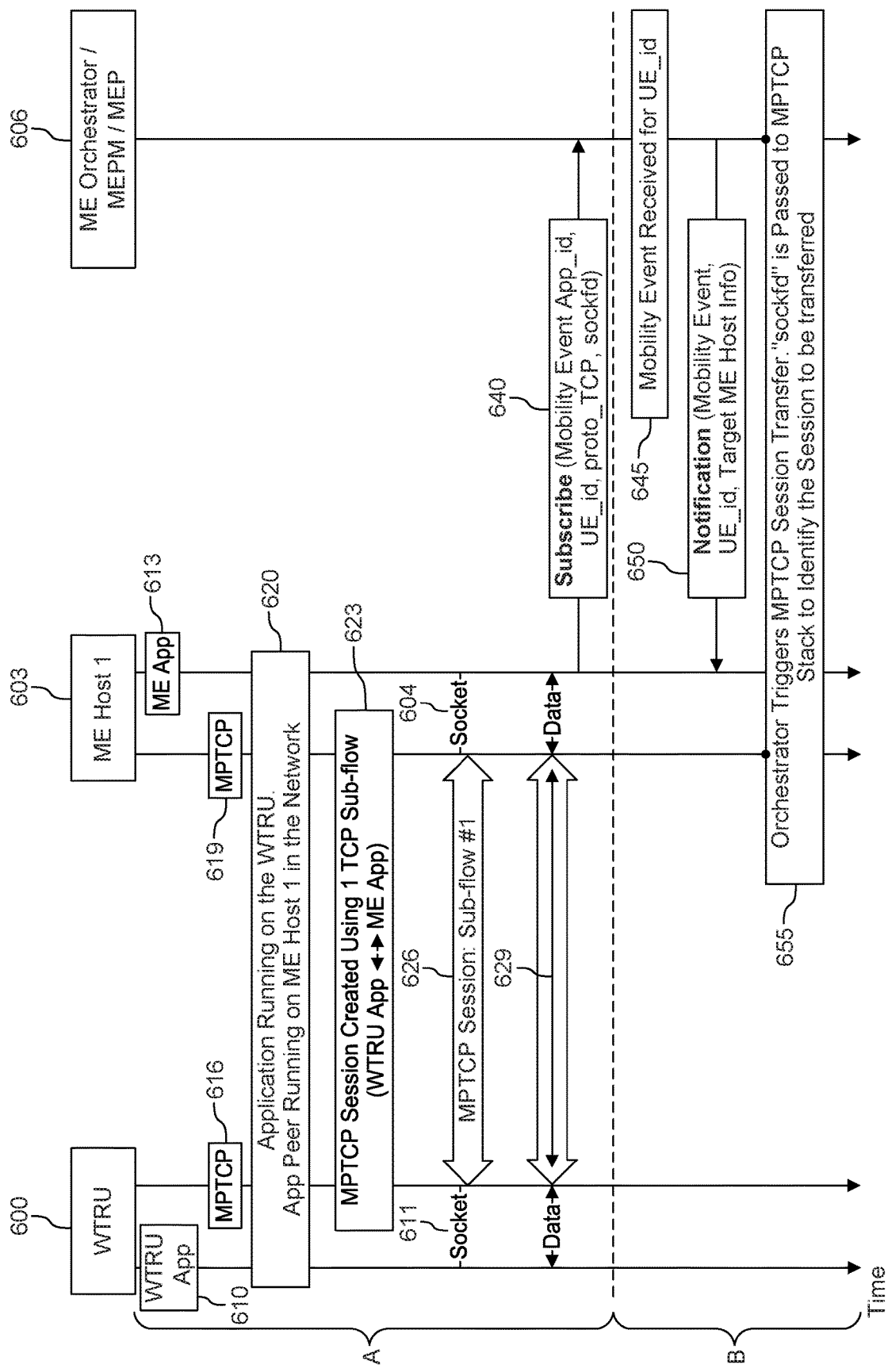
FIG. 6 is a message sequence chart illustrating an example mobility subscription and trigger.

FIG. 6 is a message sequence chart showing example communications among a WTRU 600, a first ME host 603, and an MEO 606 (or MEPM, or MEP), which illustrate example mobility subscription and triggering. Section A relates more specifically to mobility subscription, and section B relates more specifically to triggering. Sections A and B are discussed in more detail below. In this example, MEO 606 is aware of the mobility of WTRU 600, and determines, based on the movement of the WTRU (e.g., obtained from the network as described herein), whether to move an ME App 613 from ME host 603, and to which target ME host ME App 613 should be moved. MEO 606 also determines which target ME host. While the orchestrator (which is a MEO, MEPM, MEP or a combination of any of these) as discussed herein may be responsible for mobility and the trigger, the concepts discussed herein relating to the orchestrator may be carried out by another entity serving this function.

The ME App 613 may be aware of whether it is TCP-based or not, but it may not be aware of MPTCP usage by WTRU 600 (i.e., MPTCP stack 616). In some examples, MPTCP is transparent to the ME App 613. Example implementations involving MPTCP-aware applications are described later.

The ME App may subscribe to receive client- (i.e., WTRU) related mobility events from MEO 606. During this step, the ME App 613 may provide information to MEO 606 (e.g., ME Application identifier and WTRU identifier information). This information may enable the orchestrator to map a specific WTRU identifier associated with a mobility event, to an ME Application. The MEO 606 may thus have enough information to trigger ME App mobility procedures.

MEO 606 may also need to determine if an MPTCP session is in use by the ME App 613. If so, then the MPTCP session must also be transferred to the target ME host. A plurality of MPTCP sessions may exist between ME App 613 and WTRU App 610 (e.g., for different traffic types). If so, these MPTCP sessions are all to be transferred to the target ME host.

A socket descriptor used by the ME App 613 toward WTRU 600 may therefore be specified with its type (e.g., TCP or UDP), in addition to the parameters specified above (i.e., ME App and WTRU identifiers). In some examples, MPTCP is not used if UDP is specified. Accordingly, MEO 606 may ignore the connectivity (UDP is connectionless). If TCP is specified, the socket descriptor may correspond to (e.g., be the same as) the MPTCP session identifier, and it may be assumed that MPTCP has started at the host and that it is automatically used when a TCP socket is opened. MEO 606 later uses this identifier to trigger the MPTCP session transfer as discussed herein.

Based on the mobility subscription from the ME App 613, MEO 606 may determine whether an MPTCP session must be transferred when WTRU mobility is detected, and which MPTCP session to transfer, based on the socket descriptor.

The subscription and notification steps described with relation to FIG. 6 are examples of how the socket descriptor may be passed to the orchestrator. In some implementations the socket descriptor may be passed in other ways without impacting the MPTCP session transfer procedures, as discussed herein.

Section A of FIG. 6 describes the subscription in greater detail. Here, WTRU App 610 is started on WTRU 600. WTRU App 610 intends to engage in communications 620 with a server, such as ME App 613 running on ME host 603. An MPTCP stack 616 is running on WTRU 600, and MPTCP stack 619 is running on ME host 603. A TCP socket 611 may be created by the WTRU App 610 to communicate with ME App 613 via a TCP connection. Since MPTCP stack 616 is running on WTRU 600, it may intercept the socket request and create an MPTCP session 623 with ME host 603 (i.e., via MPTCP stack 619). A TCP sub-flow 626 is created to handle data traffic 629 between WTRU App 610 and ME App 613; i.e., the client and server sides of the application. In this example, ME App 613 supports host relocation, and transmits a subscription 640 to the MEO 606 to receive notification of mobility events. The subscription (or a related communication) may include information regarding the protocol used by the ME App 613 for communication with the WTRU App 610 (e.g., "proto_TCP") and a corresponding socket descriptor (e.g., "sockfd").

Section B of FIG. 6 describes the triggering in greater detail. Here, MEO 606 receives a mobility event 645 for the WTRU 600. Since the ME App 613 has subscribed to this event for that specific WTRU (i.e., WTRU 600), MEO 606 communicates a notification 650 to ME App 613. MEO 606 also triggers MPTCP session transfer at step 655 using the socket descriptor (e.g., "sockfd") parameter received at subscription time. The MPTCP stack may use the socket descriptor parameter to determine which MPTCP session needs to be transferred, e.g., as further described herein.

In some embodiments, MPTCP session transfer may be realized using different methods. In a first example method, the transfer may be handled by the orchestrator using socket APIs. In a second example method, the transfer may be handled via direct communication between the current MPTCP stack and the target MPTCP stack. Such methods are described further detail herein. Both methods are described using, for example, the orchestrator to trigger the MPTCP session transfer. To trigger the MPTCP session transfer, in some examples, the orchestrator must be aware of the socket file descriptor which identifies the MPTCP session to be transferred. In various examples herein, it is assumed that the orchestrator obtains this information from the ME App during a Mobility Event subscription, e.g., as described earlier. It is noted however that in some embodiments the orchestrator may obtain this information in another suitable manner.

A plurality of MPTCP sessions in use by a WTRU App; accordingly, multiple MPTCP sessions may need to be moved. In such cases, in some implementations, the same mobility procedure is repeated multiple times, in sequence or in parallel. Alternatively, in some implementations, a single procedure may be used to move multiple sessions concurrently or simultaneously.

As shown and described for example with respect to section B of FIG. 5, the orchestrator may trigger a preparation phase of the MPTCP session relocation prior to ME App relocation. During the preparation phase, an MPTCP stack may be instantiated on the target ME host if it is not already running. After instantiation, the target MPTCP stack may be ready to receive information relating to the MPTCP session to be transferred. Such information may include security keys, tokens, sequence numbers, and the like, e.g., as described further herein. The MPTCP stack may receive, e.g., amongst this MPTCP session configuration, the IP address that the WTRU has obtained from the ME host on which the MPTCP stack is running, or from an anchor node which is close to the target ME host. The WTRU may obtain multiple IP addresses while attaching to different anchors. To obtain the shortest data path between the WTRU and the ME App, the WTRU IP address assigned by the target ME host, or by the anchor node closest to the target ME host may be selected.

After these operations are complete, a new sub-flow may be created between the MPTCP instance running on the target host and the MPTCP client running on the WTRU. This new sub-flow may be created initially with its priority or type set to indicate that it is an a "pre-allocated" state; i.e., that it cannot be used for data transfer at this point. The IP address allocated by the target ME host (i.e., where the WTRU has moved—the WTRU's current anchor node) to the WTRU may be used for creation of this new sub-flow, e.g., to facilitate the shortest data path in being used for this new sub-flow.

In some implementations, communication between the target ME MPTCP stack and the WTRU MPTCP stack may require transfer of the security info (e.g., security keys) being used for the original MPTCP session (i.e., between WTRU and the original ME host) to the target MPTCP stack. In some implementations, this transfer may be done in a secured way.

The WTRU may not be aware that the new (pre-allocated) sub-flow has been created with another ME host (i.e. target MPTCP stack). The target MPTCP stack may use the same keys as the initial MPTCP stack on the original ME host. At this point, communications and data transfer may still be ongoing between the WTRU and the initial ME host. Such "in-advance" sub-flow creation may be performed in order to expedite the connection switch from the original sub-flow (between the WTRU and the original ME host) to the new sub-flow (between the WTRU and the target ME host) once the ME App transfer is completed, as discussed herein As shown and described for example with respect to section C of FIG. 5, an orchestrator may trigger ME App relocation concurrently with the completion of MPTCP session relocation. At this step, the target MPTCP stack may be already configured with the existing MPTCP session that is being transferred and a new sub-flow, between the target ME host and the WTRU, may be already have been created with its state or priority set to "pre_allocated". This may be handled during the preparation step, as described earlier.

After the ME App relocation is triggered, an update of dynamic information related to the sub-flows and data transfer (e.g., sequence numbers for the MPTCP session) may be exchanged between the initial MPTCP stack and the target MPTCP stack, via the MEO. This MPTCP information transfer may be performed during ME App transfer; accordingly, in some cases it does not lengthen the ME App relocation process. At this point, the target ME host is ready to handle data traffic from the WTRU. To begin handling this data traffic, the new MPTCP sub-flow toward the target ME host from the WTRU, which was created in advance (i.e., during the preparation phase), may be configured as a "regular" sub-flow (i.e., changing its type or priority from "pre-allocated"). After the new sub-flow is configured as a "regular" sub-flow, the initial sub-flow may be changed to a "not_available" subflow. Other sub-flows associated with the original ME host, if any, may be closed. After the initial sub-flow is made "not-available," data traffic may then be exchanged between the WTRU App and the target ME App, as via the new sub-flow.

Some Applications may store the IP address assigned to a TCP connection. Accordingly, to support transparent MPTCP session and ME App mobility from the perspective of the WTRU App, the initial sub-flow associated to the MPTCP session may be maintained as long as the MPTCP session exists—even if it is no longer used for data traffic. Accordingly, such a sub-flow may be identified as not available (e.g., using a priority or state "NOT_AVAILABLE"). This priority may indicate that the sub-flow must be maintained despite no longer being used for data traffic, and that no other sub-flows may be created using the ME host address associated with this sub-flow. A sub-flow priority (e.g., "MP_PRIO") message may be used by the original ME host to change the initial sub-flow priority from "regular" to "not_available". The new sub-flow toward the target ME host priority may be changed by the target ME host from "pre-allocated" to "regular".

In some implementations, based on MPTCP session transfer as discussed herein, a relocated ME App may resume traffic data transfer after the ME Application transfer is completed, as if it were still located on the previous ME host, using the same socket descriptor, e.g., without establishing a new TCP connection with the WTRU.

Regarding the MPTCP information to be transferred, in some embodiments, all MPTCP sessions associated with the ME App being relocated are transferred to the MPTCP stack running on the target host. For each MPTCP session to be transferred, information related to the MPTCP session is also transferred. For example, such information may include security keys (e.g., server security keys and client security keys), tokens that identify the session (e.g., server and client tokens that may be needed for new sub-flow creation or existing sub-flow removal), a sequence number for the overall MPTCP session, and the like.

In some embodiments, MPTCP session transfer is handled by the orchestrator (as opposed to via direct communication between MPTCP servers, as discussed later). Generally, the orchestrator may be aware of movements of the WTRU; which may facilitate the orchestrator in coordinating MPTCP session transfer. In such embodiments, the orchestrator uses APIs toward the current MPTCP stack (on the initial ME host) to obtain the MPTCP information to be transferred to the target MPTCP stack. The target MPTCP stack may also be configured using APIs. Examples of such APIs are discussed in further detail herein.

Figure 7A:
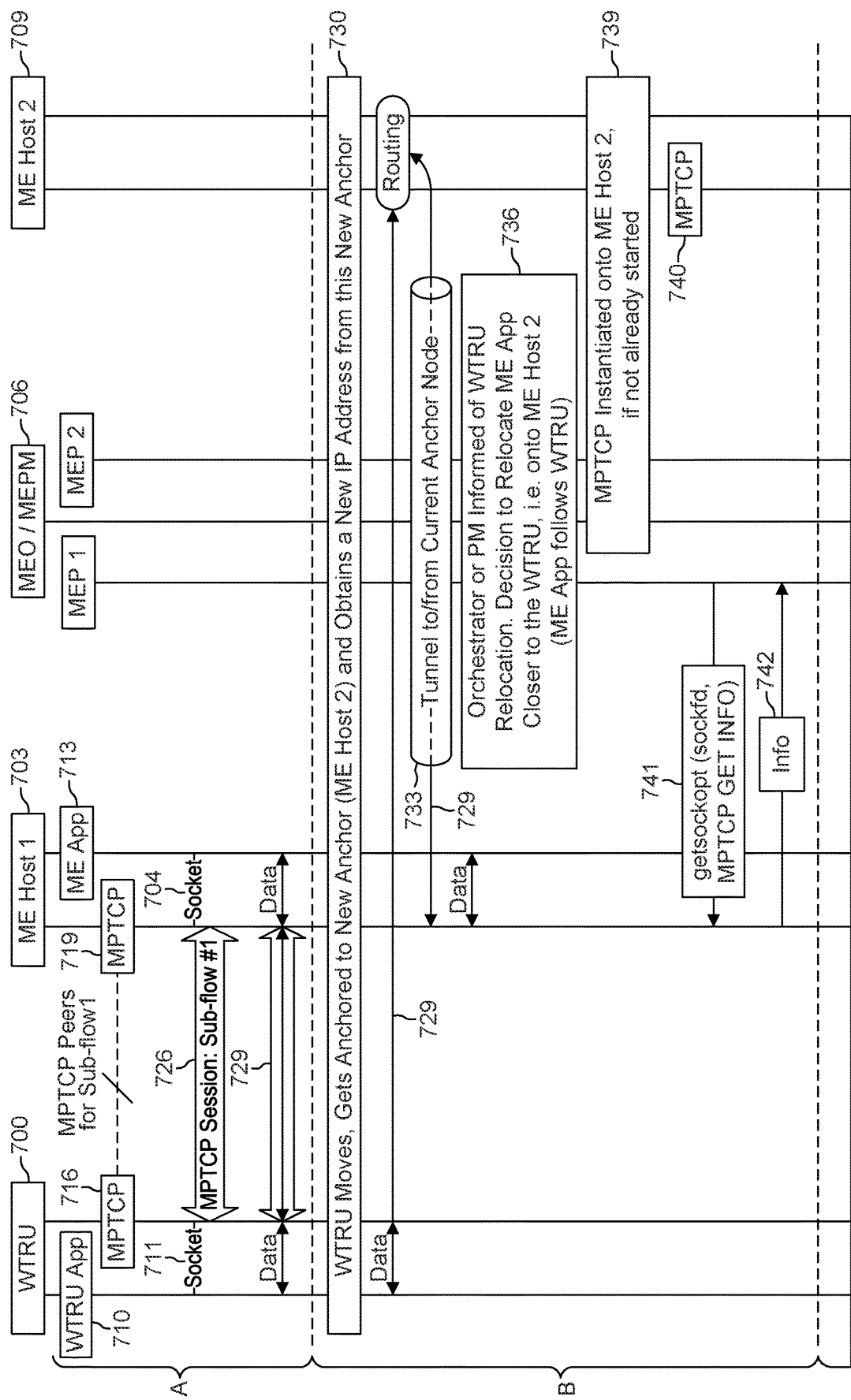
FIG. 7A is a message sequence chart illustrating an example MPTCP session transfer preparation phase.
Figure 7B:
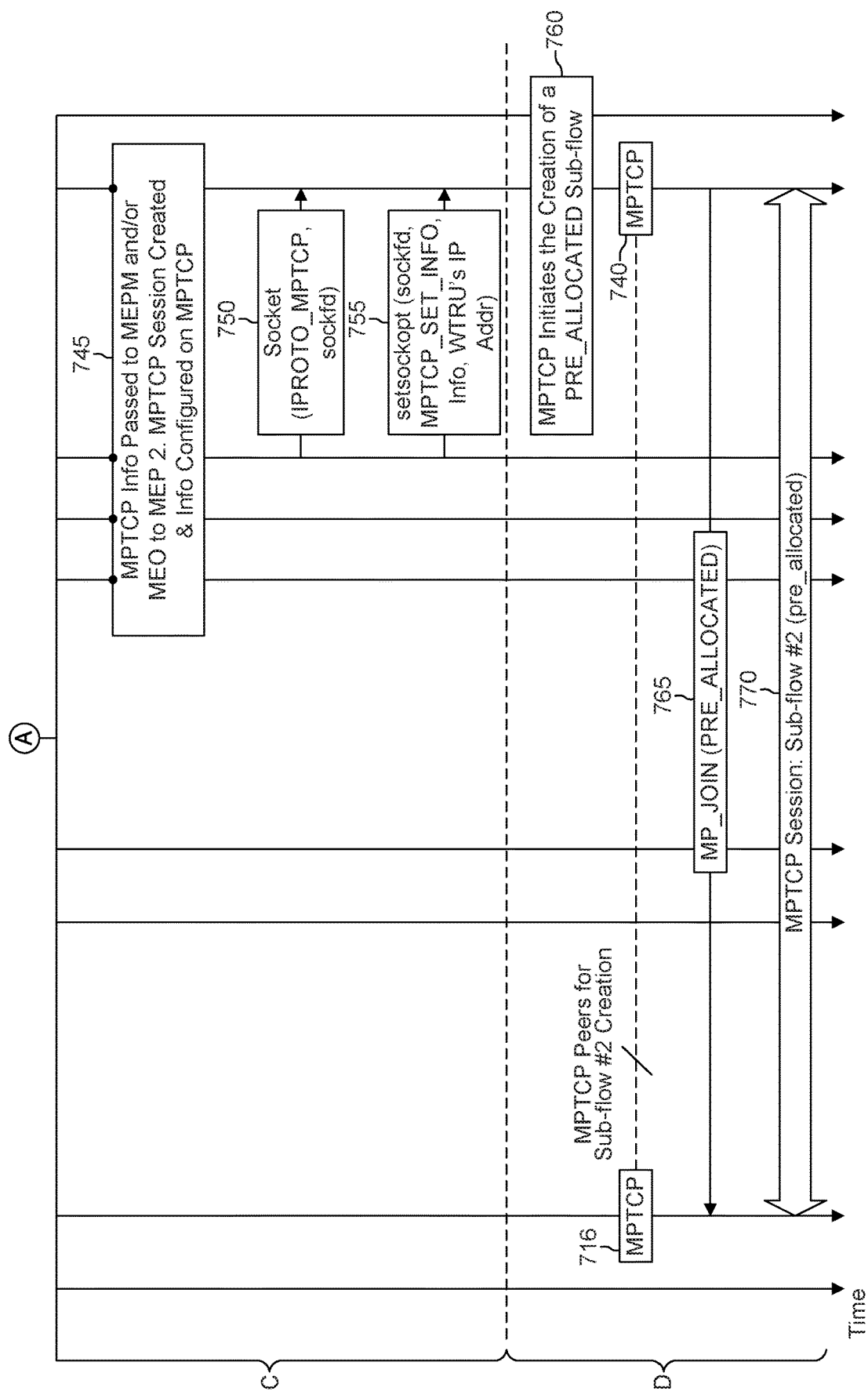
FIG. 7B is a message sequence chart continuing the illustration of an example MPTCP session transfer preparation phase from FIG. 7A.

FIG. 7 is a message sequence chart illustrating example communications among a WTRU 700, a first ME host 703, an MEO 706 (or MEPM), and a second ME host 709, for an example MPTCP session transfer at the preparation phase, where MPTCP session transfer is handled by the orchestrator. In this example, MEO 706 is illustrated together with its associated MEP instances MEP 1 and MEP 2. In this figure, MEP 1 and MEP 2 are running on ME host 703 and ME host 709 respectively to interact with the MEO 706. Information related to the MPTCP session may be transferred to another MPTCP instance running on another ME host, in preparation for data flow transfer, as shown in FIG. 7. The message sequence chart of FIG. 7 is shown and described in four sections, A, B, C, and D.

In section A of FIG. 7, WTRU 700 begins running a WTRU App 710 which is or will be in communication with a ME App 713 running on ME host 703. MPTCP stack 716 is running on WTRU 700 and MPTCP stack 719 is running on ME host 703, where MPTCP stack 716 and MPTCP stack 719 are MPTCP peers. WTRU App 710 creates a TCP socket 711 to communicate with ME App 713 via a corresponding TCP socket 704. The socket creation request is intercepted by MPTCP stack 716, which creates an MPTCP session with an associated sub-flow 726, after which data traffic 729 may be exchanged between the client and server application sides (i.e., WTRU App 710 and ME App 713 respectively).

In section B of FIG. 7, WTRU 700 moves, attaches to a new anchor node at ME host 709, and obtains a new IP address from ME host 709 in step 730. Session continuity may be preserved for sub-flow 726 although, as shown in FIG. 7, the data path using sub-flow 726 is longer than prior to the handover in step 730.

In this example, data traffic 729 is tunneled between the two anchors; i.e., between currently connected ME host 709 and previously connected ME host 703, via tunnel 733. In step 736, MEO 706 is notified (e.g., by the network. For example, the MEO 706 may register with the network to be notified when the WTRU moves/does handover to another PoA/anchor) of the movement of WTRU 600, and determines that the ME App 713 should be moved to another ME host to "follow" (i.e., be physically closer to) the WTRU. In step 739, an MPTCP stack 740 is instantiated on ME host 709, if it is not already running, and MEO 706 triggers the preparation of a MPTCP session transfer.

In this example, MEP1 uses a socket API 741 locally on ME host 703 to obtain the MPTCP information 742 to be transferred, e.g., to create a new sub-flow. Information 742 may include, for example, the IP address of WTRU 700, security keys, and so forth. In some examples, a "getsockopt" socket API may be used for this purpose, however other sockets may be used, e.g., as discussed further herein. The information obtained is transferred to MEO 706. Any existing sub-flows between MPTCP 716 and MPTCP 719 are not transferred to MPTCP 740; rather, new sub-flows are established between the WTRU 700 and the target ME host 709.

Section C of FIG. 7 describes socket APIs used by target ME host 709 to configure the MPTCP session. Here, the MPTCP information 742 is passed from MEO 706 to ME host 709, and an MPTCP session is created on MPTCP stack 740 with the information obtained from MPTCP stack 719. For example, the MPTCP session may be duplicated on the target ME host 709, e.g., using the same socket file descriptor, security keys and sequence number. A "socket" socket API 750 and "setsockopt" socket API 755 may be used for this purpose. The IP address of WTRU 700 is obtained from the ME host 709, is associated with the transferred MPTCP session, and configured onto the MPTCP stack 740. Existing sub-flows are associated with two addresses; a first IP address from the WTRU 700 and a second IP address from the ME host. Because the IP address of ME host 703 is not valid on the target ME host 709, this information is not transferred.

In section D of FIG. 7, after the MPTCP information transfer of section C is completed, the target MPTCP stack 740 initiates the creation of a new sub-flow 770 based on the IP address of WTRU 700 (obtained as part of the transferred information) and a local IP address that is valid on the ME host 709. Creation of new sub-flow 770 with the MPTCP stack 716 (i.e., the MPTCP peer for sub-flow 770) is initiated from the ME host 709 as a PRE_ALLOCATED sub-flow using an MPTCP message 765 sent to WTRU 700. In this example, message 765 is a MP_JOIN message, although it is noted that other suitable messages may be used in other implementations. Pre-allocated sub-flows are described elsewhere herein. In some examples, a plurality of new pre-allocated sub-flows (not shown) may be created in advance to replace existing sub-flows. For example, if WTRU 700 were to initially have 2 sub-flows toward ME host 703 (e.g., using cellular and WiFi interfaces), then 2 pre-allocated sub-flows may be created toward ME host 709 (e.g., also using cellular and WiFi, if supported on ME host 709) using ME host 709 IP addresses.

After the MPTCP session transfer preparation phase described with respect to FIG. 7 is complete, data traffic continues to be exchanged between WTRU 700 and ME host 703. Only the MPTCP session transfer preparation performed at this point; accordingly, ME App 713 may still be running on ME host 703. Thus, while MPTCP session transfer may have been started and a new, pre-allocated sub-flow 770 may have been created toward ME host 709, this sub-flow may not be used to transfer data traffic at this stage. It is noted that in other implementations, new pre-allocated sub-flow creation may be initiated by the WTRU, as described later herein.

Figure 8A:
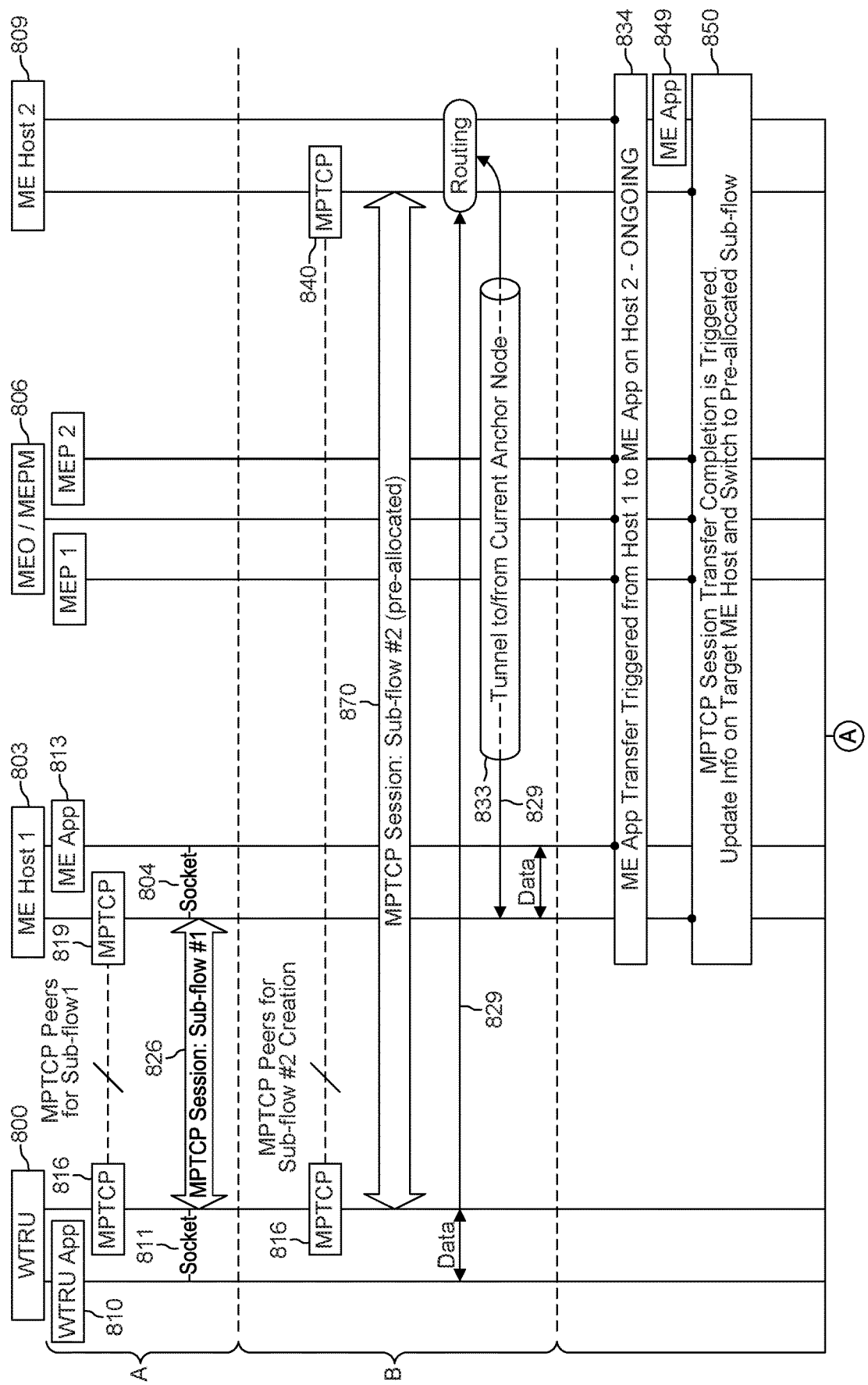
FIG. 8A is a message sequence chart illustrating an example MPTCP session transfer completion phase.
Figure 8B:
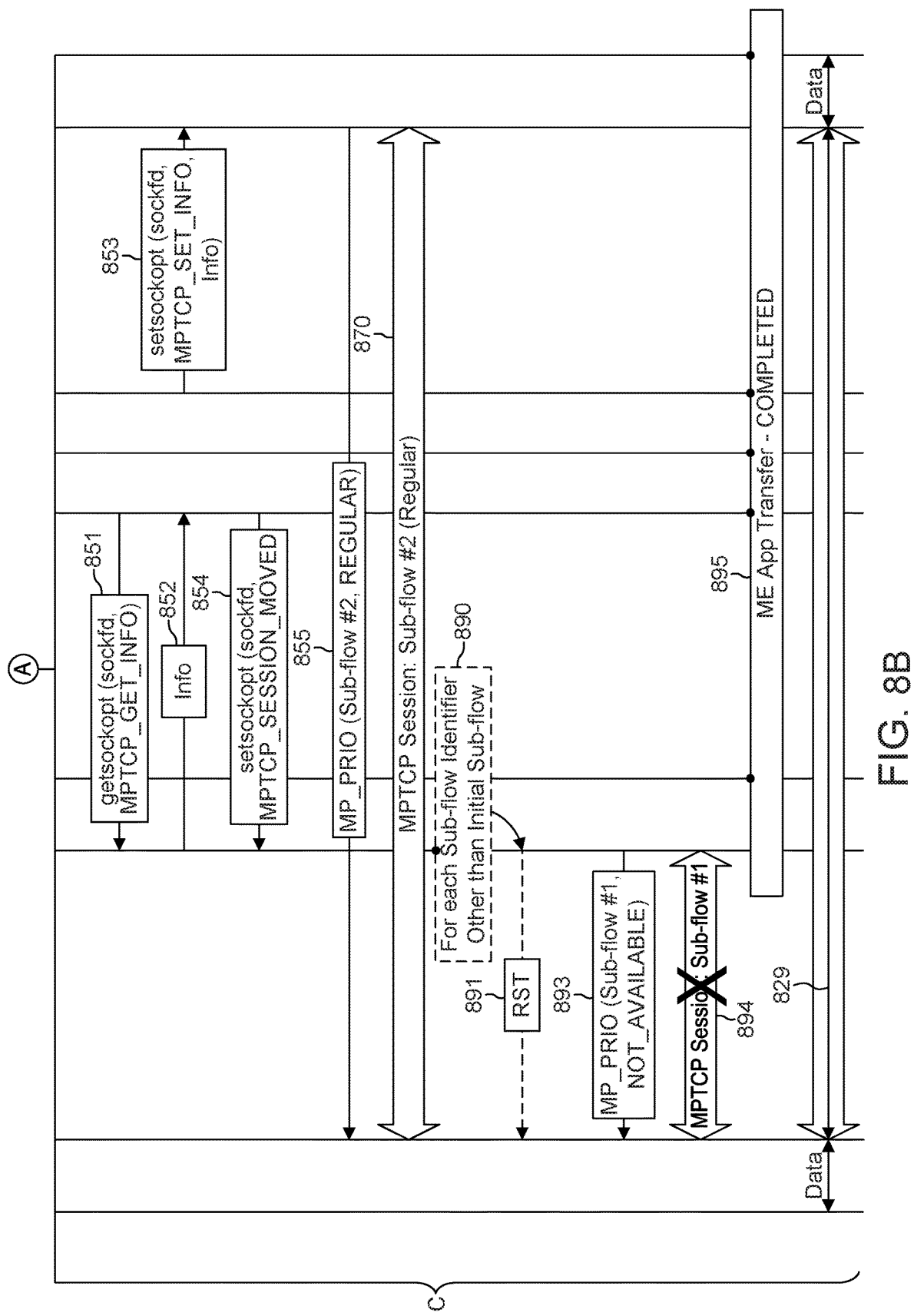
FIG. 8B is a message sequence chart continuing the illustration of an example MPTCP session transfer completion phase from FIG. 8A.

FIG. 8 is a message sequence chart illustrating example communications among a WTRU 800, a first ME host 803, an MEO 806 (or MEPM), and a second ME host 809, for an example MPTCP session transfer completion phase where the MPTCP session transfer is handled by the orchestrator. In this example, MEO 806 is illustrated together with its associated MEP instances MEP 1 and MEP 2. In this figure, MEP 1 and MEP 2 are running on ME host 803 and ME host 809 respectively to interact with the MEO 806. During the example completion phase, the MPTCP session transfer which has been prepared in advance, e.g., as described with respect to FIG. 7, is completed. The target MPTCP instance may be updated with dynamic information related to the latest data transfer. Such update may occur between the preparation and completion steps, after which data traffic may be exchanged between the WTRU and target ME host 809, via the MPTCP target instance.

Section A of FIG. 8 illustrates WTRU App 810 executing on WTRU 800. The various elements and communications shown in Section A of FIG. 8 are substantially similar to the corresponding elements and communications shown in Section A of FIG. 7. WTRU APP 810 interacts with ME App 813 executing on ME host 803. WTRU App 810 and ME App 813 may function in a client-server relationship respectively. WTRU 800 is running MPTCP stack 816, and ME Host 803 is running a corresponding MPTCP stack 819. WTRU App 810 creates TCP socket 811 to communicate with ME App 813 via a corresponding TCP socket 804. The TCP socket request is intercepted by MPTCP stack 816, which creates an MPTCP session based on the TCP socket request 811, with a sub-flow 826 to corresponding MPTCP stack 819. Data traffic 829 is exchanged between WTRU App 810 and ME App 813 over sub-flow 826.

Section B of FIG. 8 illustrates a context after WTRU 800 moves and becomes anchored to ME host 809. The various elements and communications shown in Section B of FIG. 8 are substantially similar to the corresponding elements and communications shown in Section B of FIG. 7. MEO 806 is notified of the WTRU movement and determine that the ME App 813 should be moved to ME host 809 to "follow" the WTRU. In this example, MEO 806 triggers preparation of the MPTCP session transfer, and the MPTCP session may be transferred to MPTCP stack 840 of ME host 809. MPTCP stack 840 creates a new pre-allocated sub-flow 870 between WTRU 800 and ME host 809 (e.g., where sub-flow 870 is of priority "PRE_ALLOCATED"). At the end of Section B of FIG. 8, the data traffic 829 between WTRU App 810 and ME App 813 continues to be communicated over sub-flow 826, via ME host 809 and tunnel 833.

In section C of FIG. 8, the MEO 806 triggers transfer of ME App 813 to ME host 809 at step 834. The transferred ME App is referred to in FIG. 8 as ME App 849. MEO 806 also triggers MPTCP session transfer completion at step 850. It is noted that the application transfer (e.g., step 834) and MPTCP session transfer (e.g., step 850), may be performed in parallel (e.g., simultaneously or concurrently).

MPTCP session specific information has already been transferred to the target MPTCP stack 840 (in section B), however, since data transfer has potentially continued during the preparation phase, some information may need to be updated (e.g., MPTCP sequence number). In this example, the update is handled by MEO 806 transmitting a message 851 to query the MPTCP stack 819 on ME host 803 for updated MPTCP session information (e.g., using a "getsockopt" function, as further discussed herein), which returns the information in message 852. MEO 806 transmits a message 853 with the information to MPTCP stack 840 on target ME host 809 (e.g., using a "setsockopt" function as further discussed herein). MEO 806 may inform the MPTCP stack 819 on ME host 803 that the MPTCP session has been moved. The MPTCP stack 840 on target ME host 809 may complete the MPTCP session transfer on its side by transmitting a message 855 to change the priority of the pre-allocated sub-flow 870 to REGULAR.

After sub-flow 870 is changed to a regular sub-flow, all sub-flows related to the transferred MPTCP session that are associated with ME host 803 are closed in step 890, except for the initial sub-flow 826, by sending a MPTCP message 891 to MPTCP stack 816 on WTRU 800 from MPTCP stack 819 on ME host 803. In this example, only 1 sub-flow is illustrated for ease of description; accordingly, the example steps to close other sub-flows are shown with dotted lines.

As stated earlier, the initial sub-flow is a special case and in some implementations is preserved even if it is no longer used to transfer data traffic. Accordingly, in this example the priority associated with the initial sub-flow is set to "NOT_AVAILABLE" by sending MP_PRIO message 893 to MPTCP stack 816 on WTRU 800 from MPTCP stack 819 on ME host 803. The initial TCP sub-flow may remain active, although not used, until it is closed from the WTRU side or it expires (i.e., no responses from keepalive) at operation 894. The MPTCP session may be silently discarded when the remaining sub-flow is closed or if the MPTCP session is closed by the WTRU.

In some implementations, the silent MPTCP session discard is handled locally on ME host 803 exclusively; i.e., nothing is sent to the WTRU in this regard because the MPTCP session may still exists for WTRU 800, and is transferred to a different ME host. Accordingly, MPTCP stack 819 on the initial ME host 803 may perform memory cleanup to free memory. If, later the ME App 849 is transferred to yet another ME host (e.g. ME host 3, not shown), all sub-flows associated with ME host 809, once the transfer of ME App and MPTCP are completed, may be closed. The MPTCP session on the ME host 2 may also be silently discarded. This behavior differs compared with ME host 803 since the initial sub-flow is associated to ME host 803, and not to ME host 809. Accordingly, ME host 809 may be cleaned-up completely after ME App 849 is transferred.

At the end of section C, ME App transfer to ME App 849 is completed at step 895, MPTCP session transfer is completed, the initial sub-flow 826 is preserved at a non-data transfer priority (e.g., "NOT_AVAILABLE"), and data traffic 829 can be transferred between WTRU App 810 on WTRU 800 and ME App 849 on ME Host 809 over sub-flow 870.

It is noted that in an alternative embodiment (not shown), a BACKUP priority, instead of the PRE_ALLOCATED priority, may be used for the sub-flow created during the preparation step (e.g., sub-flow 870 during section B of FIG. 8). In this case, after all sub-flows on the initial ME host are closed (and initial sub-flow is set to NOT_AVAILABLE), the BACKUP sub-flow associated with the target ME host may be used as a normal backup sub-flow. The priority of this sub-flow may be later changed to REGULAR, after the MPTCP session transfer is completed.

In this alternative, an extra flag (e.g., DON'T_USE flag as discussed further herein) may need to be set on the BACKUP sub-flow, in addition to the BACKUP flag. The extra flag may be needed in the event that the initial sub-flow fails after the preparation phase has finished but before the completion phase has started. In such cases, the backup sub-flow on a target ME host may not be used, since the ME Application has not yet been transferred onto this ME host. Instead, a backup sub-flow from the initial ME host may be used (if any).

The orchestrator may use one or more new APIs, e.g., as described below, to obtain MPTCP-related information from the MPTCP stack running on the current ME host (e.g. ME host 1) and to configure the MPTCP stack on target ME host (e.g., ME host 2).

The socket file descriptor (e.g., "sockfd") used by the ME App may be obtained using existing commands on the ME host (e.g., commands like "netstat") or by looking into system files (e.g., system files like "/proc/net/tcp", "/proc/{pid}/fd"). Another possibility may be to obtain the file descriptor directly from the ME App, e.g., via a registration mechanism. This information may be made available to the orchestrator (MEP, MEPM or MEO) via a registration mechanism. It is noted that in various examples herein, the MEO is aware of which WTRU is moving, that the ME App knows which WTRU is associated with which user and to which sockfd, the MEO needs to know to which sockfd the MPTCP session should be transferred, and an MPTCP-aware ME App may trigger the MPTCP session transfer directly.

Table 2 describes example arguments to the function "socket" to create a socket associated with an MPTCP session. The new socket protocol value (IPPROTO_MPTCP) may enable the creation of a socket handled by MPTCP stack and use the specified file descriptor value. Socket configuration using setsockopt( ) may be expected following the creation of this MPTCP socket. This socket may be called on the target ME host platform to create a socket associated with a specific file descriptor (sockfd). An example of the API to create an MPTCP socket using the specified descriptor is as follows:
 socket (domain, type, proto, sockfd).

TABLE 2

| proto | Set to IPPROTO_MPTCP |
|---|---|
| sockfd | Represents the file descriptor of the socket used by the ME App that is to be transferred. It may be obtained with information related to an MPTCP session being transferred from another ME host.<br>"sockfd" parameter usage - with this function call - must be specified only when proto is set to IPPROTO_MPTCP. Otherwise, it may be omitted. |

Table 3 describes example arguments to the function "get MPTCP session info". Information related to an MPTCP session may be retrieved by using the getsockopt( ) function call. This may be achieved by introducing a new socket option, MPTCP_GET_INFO. The MPTCP session may be identified by the field descriptor (sockfd). An example of the socket API to retrieve MPTCP session info is as follows:
 getsockopt (sockfd, IPPROTO_TCP, option, mptcp_info, mptcp_info_len).

TABLE 3

| option | Set to MPTCP_GET_INFO. |
|---|---|
| mptcp_info | identifies a buffer in which the MPTCP information is to be returned. It is filled by the function and may be used by the caller. Examples of information include: security key from ME host 1 and MPTCP peer running on WTRU, token, sequence number. |
| mptcp_info_len | represents the length of the returned mptcp_info |

Table 4 describes example arguments to the function "set MPTCP session info". This function may be called to configure an MPTCP session with information previously obtained via getsockopt( . . . , MPTCP_GET_INFO . . . ). The WTRU's IP address allocated from the current ME host may also be specified. An example of the socket API is as follows:
 setsockopt (sockfd, IPPROTO_TCP, option, mptcp_info, mptcp_info_len, nb_addr, WTRU's local addr).

TABLE 4

| option | Set to MPTCP_SET_INFO. |
|---|---|
| mptcp_info | Discussed herein |
| mptcp_info_len | Discussed herein |
| nb_addr | Number of IP addresses specified in the following field |
| WTRU's local addr | IP address allocated to WTRU by current ME host - to be used for PRE_ALLOCATED sub-flow creation (one or many IP addresses may be specified) |

Table 5 describes example arguments to the function "set MPTCP session moved". This function may be called to inform the MPTCP stack that the specified MPTCP session has been moved. The MPTCP stack, when receiving this message, may need to close all its sub-flows immediately, except for the initial sub-flow, which may need to be maintained but no longer used for data traffic transfer. In this case, the priority NOT_AVAILABLE may be set on the initial sub-flow by sending a MP_PRIO message to the WTRU. An example of the socket API is as follows:
 setsockopt (sockfd, IPPROTO_TCP, option)

TABLE 5

| option | Set to MPTCP_SESSION_MOVED. |
|---|---|

Figure 9:
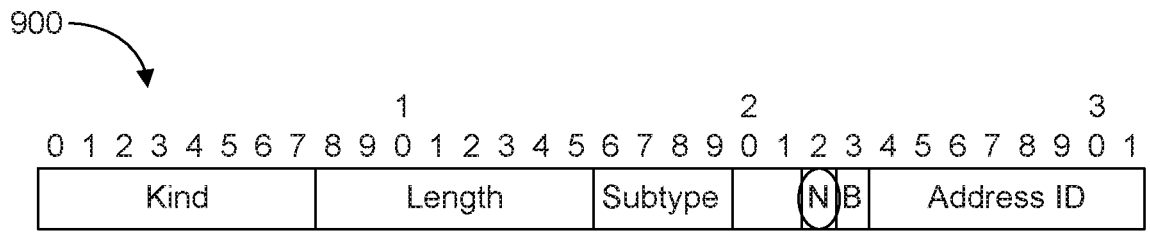
FIG. 9 is a bitmap illustrating an example modified sub-flow priority (MP_PRIO) option.

Various MPTCP messages and protocols may be used for one or more embodiments disclosed herein. For example, FIG. 9 is a bitmap 900 illustrating an example modified sub-flow priority (MP_PRIO) option. The modified MP-PRIO option of MPTCP message is enhanced to support the preservation of initial sub-flows, while flagging them as unusable, using a new priority. The new priority is: NOT_AVAILABLE (new)—N bit in MP_PRIO option. In some implementations, the new priority is set using the bit labeled "N" in the bitmap. In an example implementation, flag (N) is set to (1) to set the priority to NOT_AVAILABLE, otherwise it is set to (0).

Figure 11:
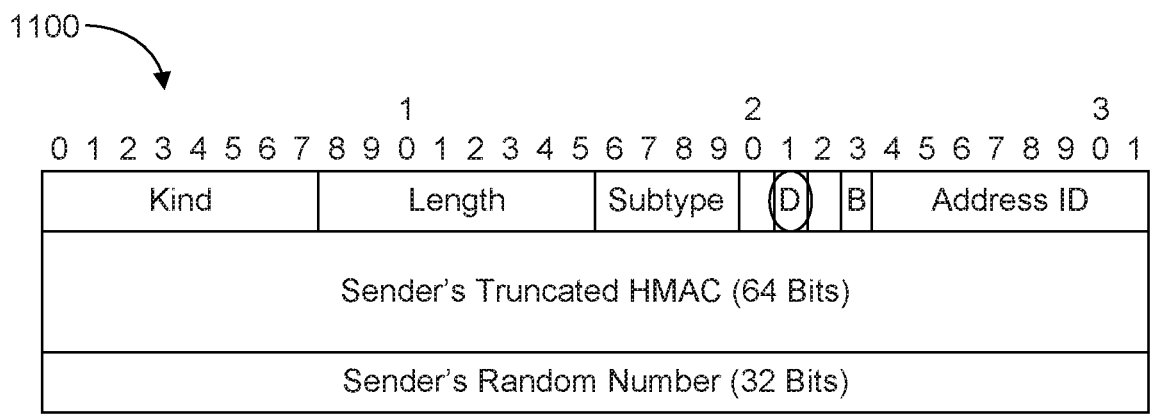
FIG. 11 is a bitmap illustrating an example modified join connection (MP_JOIN) option.

FIG. 10 and FIG. 11 show bitmap 1000 and bitmap 1100, illustrating an example modified join connection (MP_JOIN) option for initial SYN and for responding SYN/ACK respectively. The modified MP_JOIN option is enhanced to support sub-flows of priority BACKUP and DON'T_USE, and it may be used as an alternative to the PRE_ALLOCATED priority in some implementations.

The new sub-flow type may be expressed as: DON'T_USE (new)—D bit in MSG. In some implementations, the new sub-flow type is set using the bit labeled "D" in the bitmap. In an example implementation, flag (D) may be set to (1) to establish a sub-flow that may not be used for data transfer, even to back up a regular sub-flow; otherwise, it may be set to (0).

Various embodiments discussed above involve a MPTCP session transfer that is coordinated by an orchestrator (e.g., MEO). In some embodiments, in contrast, MPTCP mobility may be handled using direct communication between MPTCP stacks. In some examples, the MPTCP stacks in question are an MPTCP stack running on an ME host initially connected to a WTRU (e.g., ME host 1), and an MPTCP stack running on a target ME host (e.g., ME host 2). Such stacks typically handle server-side communication, accordingly, embodiments where MPTCP mobility is handled using direct communication between such instances involve server-to-server communication and are, in some embodiments, transparent to the client (i.e., WTRU) side.

Some embodiments where MPTCP mobility is handled using direct communication between MPTCP stacks involve communication between "non-peer" MPTCP stacks.

By comparison with typical communication, which takes place between 2 MPTCP peers exchanging information to create MPTCP sessions with associated sub-flows to transport application's data, in some embodiments, the "non-peer" communication does not transport data traffic (e.g., application data), but rather transfers MPTCP session information to a target MPTCP stack such that the target MPTCP stack can continue the existing communications with the MPTCP stack on WTRU. To handle this communication, an IP connection may be established between the two ME MPTCP stacks.

Figure 12:
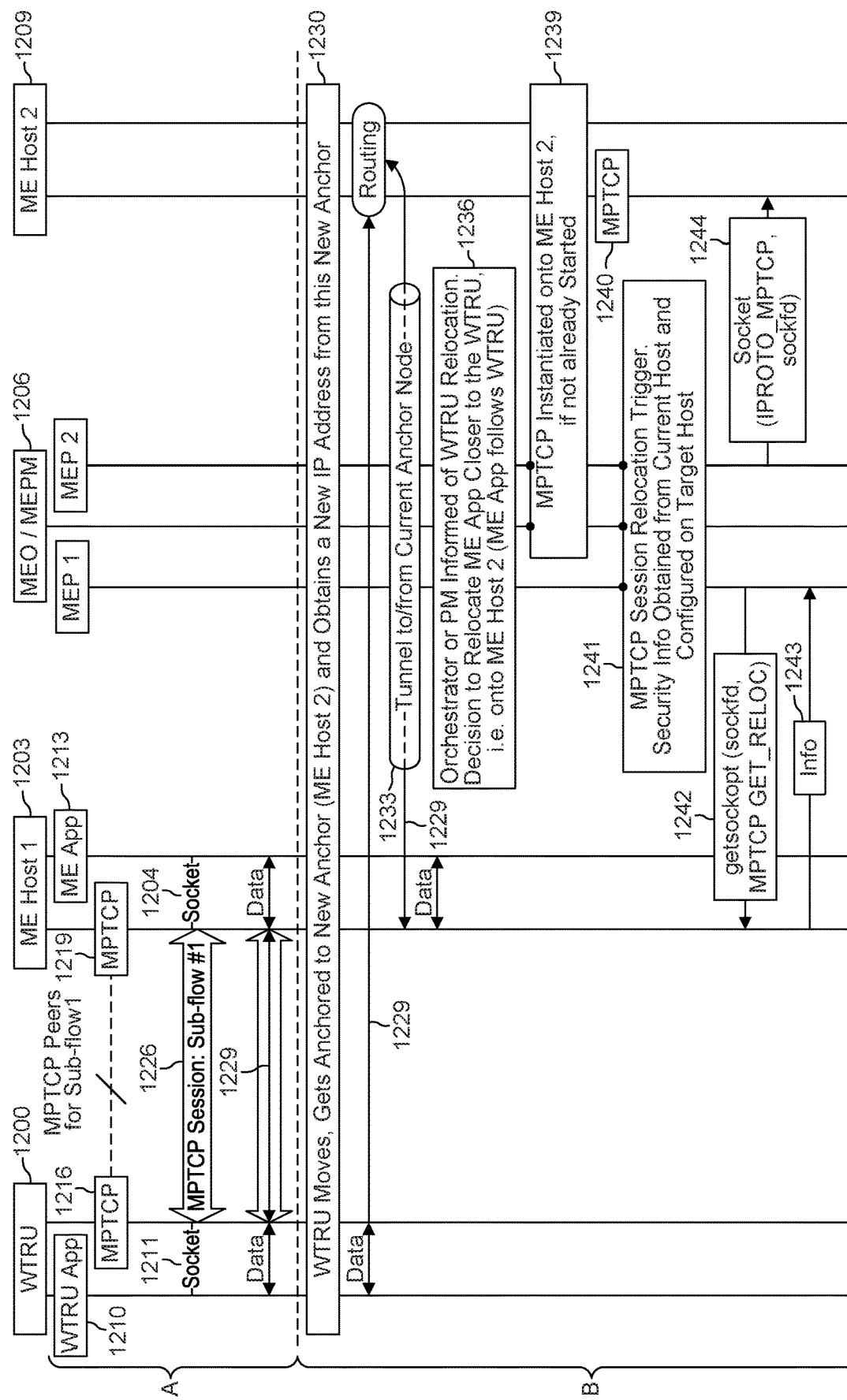
FIG. 12A is a message sequence chart illustrating an example MPTCP session transfer preparation phase.
FIG. 12B is a message sequence chart continuing the illustration of an example MPTCP session transfer preparation phase from FIG. 12A.
Figure 12B:
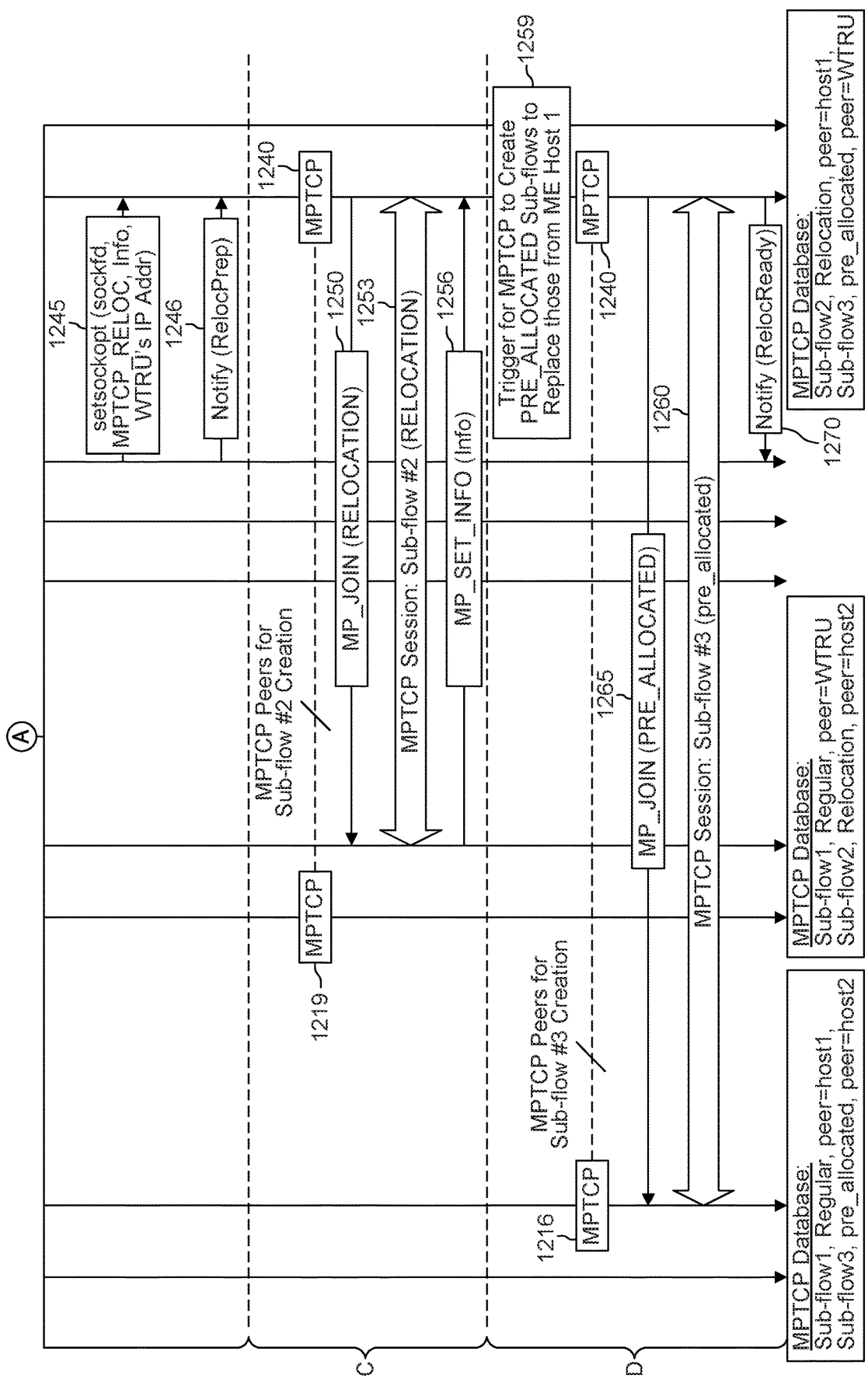

FIG. 12 is a message sequence chart illustrating example communications among a WTRU 1200, a first ME host 1203, an MEO 1206 (or MEPM), and a second ME host 1209, for an example MPTCP session transfer at the preparation phase, where MPTCP session transfer is handled using direct communication between MPTCP stacks. In this example, MEO 1206 is illustrated together with its associated MEP instances MEP 1 and MEP 2. In this figure, MEP 1 and MEP 2 are running on ME host 1203 and ME host 1209 respectively to interact with the MEO 1206. The message sequence chart of FIG. 12 is shown and described in four sections, A, B, C, and D.

Similar to orchestrator handled approaches, embodiments where MPTCP session transfer is handled using direct communication between MPTCP stacks may include a preparation phase. In such cases, information related to the MPTCP session may be transferred to another MPTCP stack running on another ME host in preparation for the data flow transfer. In some embodiments, the MPTCP session transfer is triggered by the orchestrator (e.g., MEO), which may inform the appropriate MEPM and/or MEP. At this point, interactions with MPTCP stacks may be done using the socket interface. In some embodiments, the MPTCP session transfer and exchange of related information is performed using direct communication (e.g., IP based communication) between the initial and target ME hosts.

In section A of FIG. 12, WTRU 1200 begins running a WTRU App 1210 which is or will be in communication with a ME App 1213 running on ME host 1203. MPTCP stack 1216 is running on WTRU 1200 and MPTCP stack 1219 is running on ME host 1203, where MPTCP stack 1216 and MPTCP stack 1219 are MPTCP peers. WTRU App 1210 creates a TCP socket 1211 to communicate with ME App 1213 via a TCP connection. The socket creation request is intercepted by MPTCP stack 1216, which creates an MPTCP session with an associated sub-flow 1226, after which data traffic 1229 may be exchanged between the client and server application sides (i.e., WTRU App 1210 and ME App 1213 respectively).

In section B of FIG. 12, WTRU 1200 moves, attaches to a new anchor node at ME host 1209, and obtains a new IP address from ME host 1209 in step 1230. Session continuity may be preserved for sub-flow 1226 although, as shown in FIG. 12, the data path using sub-flow 1226 is longer than prior to the handover in step 1230. In this example, data traffic 1229 is tunneled between the two anchors; i.e., between currently connected ME host 1209 and previously connected ME host 1203, via tunnel 1233.

In step 1236, MEO 1206 is notified (e.g., by the network. For example, the MEO 1206 may register with the network to be notified when the WTRU moves/does handover to another PoA/anchor), of the movement of WTRU 1200, and determines that the ME App 1213 should be moved to another ME host (i.e., ME host 1209) to "follow" (i.e., be physically closer to) the WTRU. In step 1239, an MPTCP stack 1240 (without any associated sub-flows) is instantiated on ME host 1209, if it is not already running, and MEO 1206 triggers the preparation of an MPTCP session relocation in step 1241.

In this example, MEO 1206 (via MEP1 which is running on ME host 1 1203) uses a socket API 1242 locally on ME host 1203 to obtain the MPTCP information 1243 to be transferred. Information 1243 may include, for example, the IP address of WTRU 1200, security keys, and so forth. MPTCP stack 1240 is configured with the security keys obtained from MPTCP stack 1219 on ME Host 1203. The keys may be used to allow the establishment of new sub-flows to be associated with the transferred MPTCP session. MPTCP stack 1240 is also configured with the IP address assigned to WTRU 1200 by ME host 1209.

This may be done, for example, using a regular socket API as improved to support MPTCP session transfer, e.g., as discussed herein. Local calls for configuring MPTCP stack 1240 based on the socket API in this way are shown by messages 1244, 1245, and 1246.

At this point, the keys are in use by ME host 1203 and WTRU 1200, which are the two peers associated with the MPTCP session. The target MPTCP stack may be informed, e.g., via the MEP API, that an MPTCP session relocation procedure has been started. In some examples, the target MPTCP stack may be informed via the MEP API using the socket interface or another interface; the interface may be described so that it may be socket based or may be any other interface that may exist between MEO 1206 and applications running ME host 1209. This interface between the MEO 1206 and the target MPTCP stack 1240 on ME Host 1209 may be used to keep the MEO 1206 informed of the transfer status.

Since the MEO 1206 is not handling the transfer itself in this example, MEO 1206 may need to be informed of (or receive information it can use to determine) when to trigger the ME App transfer, such as once the MPTCP transfer preparation is complete. The target MPTCP stack may also need to be informed of (or receive information it can use to determine) when to complete the MPTCP session transfer, such as when the ME App transfer is triggered.

In section C of FIG. 12, the target ME host 1209 may initiate the establishment of a connection between itself and ME host 1203, and then transfer the information. The connection between the two ME hosts may be a TCP session or a sub-flow added to the MPTCP session to be relocated. The latter is illustrated in the example of FIG. 12.

As illustrated, the target ME host 1209 may initiate the creation of a sub-flow 1253 toward the current ME host 1203, e.g., using message 1250. In this example, message 1250 is a MP_JOIN (relocation) message which sets up an MPTCP sub-flow 1253. Sub-flow 1253 may be associated with the existing MPTCP session and may be created using MPTCP sub-flow priority: RELOCATION (as opposed to existing REGULAR and BACKUP priorities). In this example, the RELOCATION priority indicates this sub-flow 1253 may only be used to transport information related to the MPTCP session transfer (i.e., not to transport data traffic). For this RELOCATION sub-flow, the security keys to be used may be the ones configured when the MPTCP transfer is triggered (at step 2). The current ME host may continue to use its keys while the target ME host uses the WTRU's keys.

It is noted that at this point, three peers are associated with the MPTCP session—the WTRU 1200, the current ME host 1203, and the target ME host 1209. Each MPTCP sub-flow exists between only two peers, however, the sub-flows do not have the same two peers. For example, sub-flow 1226 exists between ME host 1203 and WTRU 1200, while sub-flow 1253 exists between ME host 1203 and ME host 1209. As will be described later, a further sub-flow 1260 will exist between ME host 1209 and WTRU 1200.

In this example, WTRU 1200 is not involved in sub-flow 1253, may not be aware that sub-flow 1253 exists, and does not need to know that its two peers (i.e., ME host 1203 and ME host 1209) are different. Rather, WTRU 1200 may view ME host 1203 and ME host 1209 as the same MPTCP peer.

After communication is established between ME host 1203 and ME host 1209, the MPTCP session related information may be transferred to the target ME host 1209. In this example, the MPTCP session related information is transferred via sub-flow 1253 using message 1256. Message 1256 may be, for example, a MP_SET_INFO(info) message.

In section D of FIG. 12, after the MPTCP session transfer is complete, the target MPTCP stack 1240 at step 1259 triggers the establishment of a "pre-allocated" sub-flow 1260 with the WTRU 1200. In this case, and for all other communication with the WTRU, the target ME host 1209 may use the host security keys, such as the ME host 1203 security keys (and not the WTRU 1200 keys as for the relocation sub-flow). In this example, MPTCP stack 1240 may establish sub-flow 1260 by transmitting message 1265 to MPTCP stack 1216. It is noted that in other embodiments (not shown), alternatively, the "pre-allocated" sub-flow creation (between target ME host 1209 and WTRU 1200) may be triggered by the current ME host 1203, which would have previously queried the target ME host 1209 for an available IP address.

At this point, sub-flow 1260 between the WTRU and the target host is created, although it is not yet used to transfer application data traffic, as it is a "pre-allocated" sub-flow. Rather, application data is still exchanged between the WTRU App 1210 on WTRU 1204 and ME App 1213 on ME host 1203 via sub-flow 1226. The MPTCP stack 1240 on the target ME host 1209 informs the MEO 1206 that it is ready for the next phase of the transfer using message 1270. In this example, message 1270 is a Notify(RelocReady) message.

It is noted that in other embodiments (not shown), an independent TCP connection (i.e., "out of bound" from the MPTCP session) may be used to exchange information related to the MPTCP session to be transferred, instead of using a sub-flow associated with this MPTCP session. In such cases, the MEO 1206 may configure independent security keys on each side. A new set of security keys may be used for the server-server communication, and may be configured during section B of FIG. 12 above while triggering the MPTCP session transfer (e.g., using a 3-way handshake not shown in FIG. 13).

Figure 13:
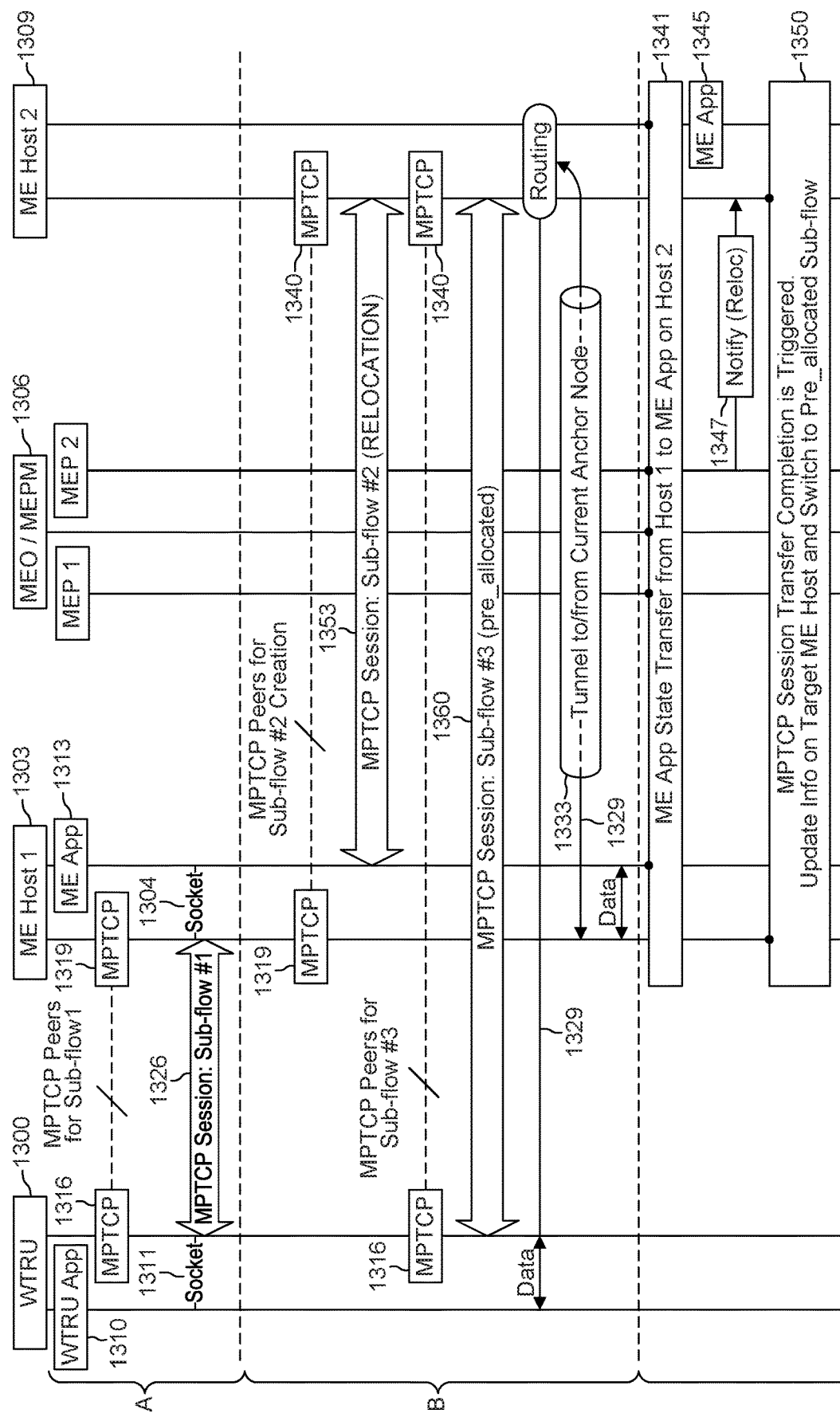
FIG. 13A is a message sequence chart illustrating an example MPTCP session transfer completion phase.
FIG. 13B is a message sequence chart continuing the illustration of an example MPTCP session transfer completion phase from FIG. 13A.
Figure 13B:
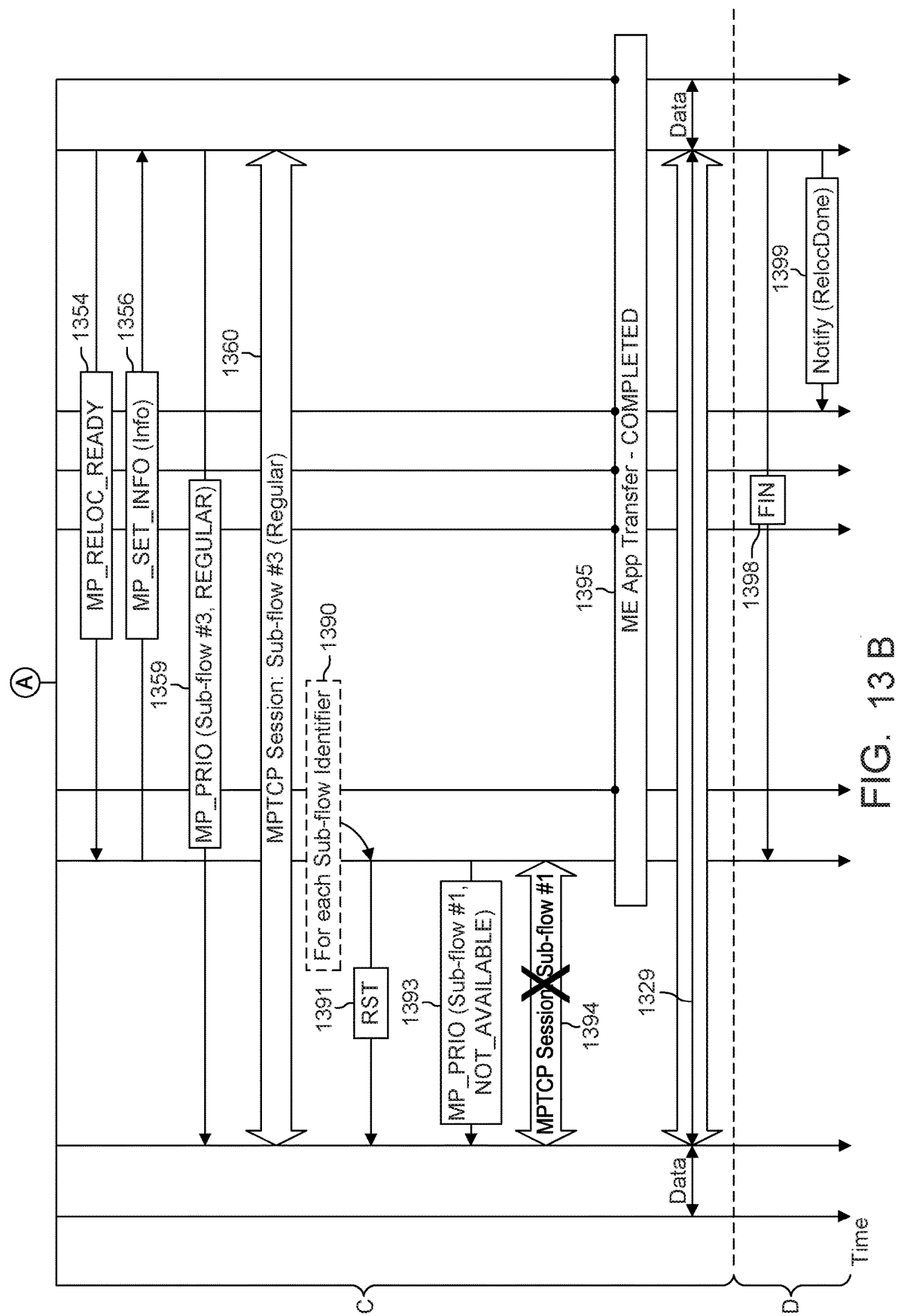

FIG. 13 is a message sequence chart illustrating example communications among a WTRU 1300, a first ME host 1303, an MEO 1306 (or MEPM), and a second ME host 1309, for an example MPTCP session transfer at the completion phase, where MPTCP session transfer is handled using direct communication between MPTCP stacks. In this example, MEO 1306 is illustrated together with its associated MEP instances MEP 1 and MEP 2. In this figure, MEP 1 and MEP 2 are running on ME host 1303 and ME host 1309 respectively to interact with the MEO 1306. During the completion phase, the MPTCP session transfer, which has been prepared in advance as described herein, is completed. The target MPTCP instance is updated with dynamic information related to the latest data transfer, and application data may then be exchanged between the WTRU and this MPTCP target instance. The message sequence chart of FIG. 13 is shown and described in four sections, A, B, C, and D.

In section A of FIG. 13, WTRU 1300 begins running a WTRU App 1310 which is or will be in communication with a ME App 1213 running on ME host 1203. MPTCP stack 1316 is running on WTRU 1300 and MPTCP stack 1319 is running on ME host 1303, where MPTCP stack 1316 and MPTCP stack 1319 are MPTCP peers. WTRU App 1310 creates a TCP socket 1311 to communicate with ME App 1313 via a TCP connection. The socket creation request is intercepted by MPTCP stack 1316, which creates an MPTCP session with an associated sub-flow 1326, after which data traffic 1329 may be exchanged between the client and server application sides (i.e., WTRU App 1310 and ME App 1313 respectively).

In section B of FIG. 13, WTRU 1300 moves, attaches to a new anchor node at ME host 1309, and obtains a new IP address from ME host 1309. Session continuity may be preserved for sub-flow 1326 although, as shown in FIG. 13, the data path using sub-flow 1326 is longer than prior to the handover in step 1330. In this example, data traffic 1329 is tunneled between the two anchors; i.e., between currently connected ME host 1309 and previously connected ME host 1303, via tunnel 1333. MEO 1306 is notified (e.g., by the network. For example, the MEO 1306 may register with the network to be notified when the WTRU moves/does handover to another PoA/anchor) of the movement of WTRU 1300, and determines that the ME App 1313 should be moved to another ME host (i.e., ME host 1309) to "follow" (i.e., be physically closer to) the WTRU. An MPTCP stack 1340 (without any associated sub-flows) is instantiated on ME host 1309, if it is not already running, and MEO 1306 triggers the preparation of an MPTCP session relocation.

Relocation sub-flow 1353 is created between ME host 1303 and ME host 1309, MPTCP session information is transferred over sub-flow 1353 to ME host 1309, and pre-allocated sub-flow 1360 between ME host 1309 and WTRU 1300 is created, as described with respect to relocation sub-flow 1253 and pre-allocated sub-flow 1260 regarding FIG. 12. Session continuity is preserved for sub-flow 1326 although, as shown in FIG. 13, the data path using sub-flow 1326 is longer than prior to movement of WTRU 1300. In this example, data traffic 1329 is tunneled between the two anchors; i.e., between currently connected ME host 1309 and previously connected ME host 1303, via tunnel 1333.

In section C of FIG. 13, the MEO 1306 triggers the transfer of ME App 1313 to ME host 1309 as ME App 1345, at step 1341. MEO 1306 transmits message 1347 to ME host 1309, possibly via MEP on target ME host 1309. Reception of message 1347 triggers MPTCP session transfer completion phase at step 1350. In this phase, the MPTCP session specific information may already have been transferred to the target MPTCP stack 1340, however, since data transfer has potentially continued during the preparation phase, some information may need to be updated (e.g., MPTCP sequence number), which may be done at this point. The target MPTCP stack 1340 may inform the current MPTCP stack 1319, e.g., using message 1354 (which may be a MP_RELOC_READY message) that it is ready to receive the latest information and complete the MPTCP session transfer. In response, MPTCP stack 1319 may send the updated information to MPTCP stack 1340, e.g., using message 1356 (which may be an MP_SET_INFO message).

After the updated information related to the MPTCP session is received on the target ME host 1309, MPTCP stack 1340 may change the priority of sub-flow 1360 from PRE_ALLOCATED to REGULAR by transmitting message 1359 (which may be a MP_PRIO message) to MPTCP stack 1316. This priority change may be repeated for each sub-flow established between WTRU 1300 and MPTCP stack 1340 on ME host 1309. For simplicity however, only one such sub-flow 1360 is illustrated in FIG. 13.

Since the MPTCP session transfer to ME host 1309 is now complete, sub-flows between the MPTCP stack 1319 on ME host 1303 and MPTCP stack 1316 on WTRU 1300 may be closed in step 1390, except for the initial sub-flow 1326, by sending a MPTCP message 1391. It is noted however that in this example, the initial sub-flow is preserved even if it is no longer used. All other such sub-flows, if any, may be closed. For simplicity, only 1 sub-flow is used in the example on ME host 1 (initial sub-flow); accordingly, the example steps to close other sub-flows are shown with dotted lines.

As stated earlier, the initial sub-flow 1326 is a special case and in some implementations is preserved even if it is no longer used to transfer data traffic. Accordingly, in this example the MPTCP stack 1319 on ME host 1303 changes the initial sub-flow priority to "NOT_AVAILABLE" by sending MP_PRIO message 1393 to MPTCP stack 1316 on WTRU 1300 from MPTCP stack 1319 on ME host 1303.

At the end of section C, ME App transfer to ME App 1345 is completed at step 1395, MPTCP session transfer is completed, the initial sub-flow 1326 is preserved at a non-data transfer priority (e.g., "NOT_AVAILABLE"), and data traffic 1329 can be transferred between WTRU App 1310 on WTRU 800 and ME App 1345 on ME Host 1309 over sub-flow 1360.

In section D of FIG. 13 the MPTCP session may be completely transferred to the ME host 1309. The remaining steps may be used in some embodiments for cleanup purposes. At this point, the relocation sub-flow 1353 for server-to-server communication (i.e., between MPTCP stack 1319 on ME host 1303 and MPTCP stack 1340 on ME host 1309) may no longer be needed, and thus it is closed, using a FIN message at 1398.

On ME host 1303, the MPTCP session may be silently discarded, (i.e., where no messages are sent to the WTRU). For ME host 1303, this MPTCP session may not exist anymore, however, it may still be in use on the WTRU—with ME host 1309 as the new peer. Accordingly, the initial TCP sub-flow may remain active on ME host 1303 and WTRU 1300 (although not used to transport application data traffic), until it is closed by WTRU 1300 or it expires (i.e., no responses from keepalive). The MPTCP stack 1340 on ME host 1309 may inform the MEO 1306 that the MPTCP session transfer is completed using message 1399 (which may be a Notify(RelocDone) message).

MEP APIs may be used for MPTCP session relocation. The following API may be used to synchronize the orchestrator and the MPTCP stack transfer phases. In embodiments where the orchestrator is not involved in the MPTCP session information transfer, it may need to be informed when the MPTCP session transfer is ready for the ME App transfer. It may be assumed that communication exists between the orchestrator/MEPM, the MEP, and the ME Applications running on the ME host. In the example herein, an MPTCP stack running on an ME host may be an ME Application. This API may facilitate the MPTCP session transfer in cases where MPTCP session transfer is handled via direct communication between the current MPTCP stack and the target MPTCP stack. Alternatively, this API may be implemented using the socket API. The following is an example of the API:

Notify (notification_type, params, params_len).
The following are example notification types:
RelocPrep, RelocReady, Reloc, RelocDone.

Table 6 describes example RelocPrep notification parameters. This notification may be sent from the MEP to the target MPTCP stack to notify the MPTCP instance that an MPTCP session transfer will be performed, e.g., to trigger the preparation phase. Example parameters which may be specified when using this notification are listed in Table 6.

TABLE 6

| request ID | number identifying the request. To be associated with "RelocReady( )" call |
|---|---|
| sockfd | Identifies the MPTCP session. Obtained during registration. |

Table 7 describes an example RelocReady notification parameter. This notification may be sent from the target MPTCP stack to MEP to indicate that the preparation steps have been completed, and e.g., that the MPTCP stack is ready for the continuation of the MPTCP session transfer.

TABLE 7

| request ID | number identifying the request. Obtained from "RelocPrep( )" call |
|---|---|

Table 8 describes an example Reloc notification parameter. This notification may be sent from the MEP to target MPTCP stack to trigger the completion of the MPTCP session transfer. This may trigger the completion phase.

TABLE 8

| request ID | number identifying the request. To be associated with "RelocDone( )" call |
|---|---|

Table 9 describes an example RelocDone notification parameter. This notification may be sent from the target MPTCP stack to MEP to indicate that the MPTCP session transfer is complete.

TABLE 9

| request ID | number identifying the request. Obtained from "Reloc( )" call |
|---|---|

Socket APIs may be used by the orchestrator to obtain MPTCP-related information from the MPTCP stack running on the current ME host (e.g., ME host 1) and to configure the MPTCP stack on the target ME host (e.g., ME host 2). The Create MPTCP socket API may be used, as previously discussed herein.

Get MPTCP_RELOC is an option which may be used to prepare for the relocation of an MPTCP session. It may be sent to the current ME host (e.g., ME host 1) to indicate an imminent MPTCP session transfer. At the same time, the security keys associated with the MPTCP session may be retrieved and transferred onto the target ME host. The security keys specified are those already used by the ME host (e.g. ME host 1) and the WTRU. Table 10 describes example Get MPTCP_RELOC API parameters. The following is an example of the socket API:

getsockopt (sockfd, IPPROTO_TCP, option, info, len).

TABLE 10

| option | Set to MPTCP_RELOC. Introduced in this document |
|---|---|
| info | identifies a buffer in which information for remote host is returned, e.g.:<br>ME host security keys<br>WTRU security keys<br>remote host IP address, port (potentially more than one) |
| len | represents the length of info in input and the length of keys in output |

Set MPTCP_RELOC is an option which may be used to prepare the relocation of an MPTCP session onto the target ME host. It may be sent to the target ME host (e.g., ME host 2) to trigger the MPTCP session transfer and to configured required information, for example security keys. The security keys specified in there may be the ones used by the ME host (e.g., ME host 1) and the WTRU.

Table 11 describes example Set MPTCP_RELOC API parameters The following is an example of the socket API:
setsockopt (sockfd, IPPROTO_TCP, MPTCP_RELOC, info, len, nb_addr, WTRU's local addr).

TABLE 11

| | |
|---|---|
| option | Set to MPTCP_RELOC. Introduced in this document |
| info | identifies a buffer in which information enabling communication between current and target ME host is specified. Examples of information is:<br>ME host security keys<br>WTRU security keys<br>remote host IP address, port (potentially more than one) |
| len | represents the length of info |
| nb_addr | Number of IP addresses specified in the following field |
| WTRU's local addr | IP address allocated to WTRU by current ME host - to be used for PRE_ALLOCATED sub-flow creation (one or many IP addresses may be specified) |

Figure 14:
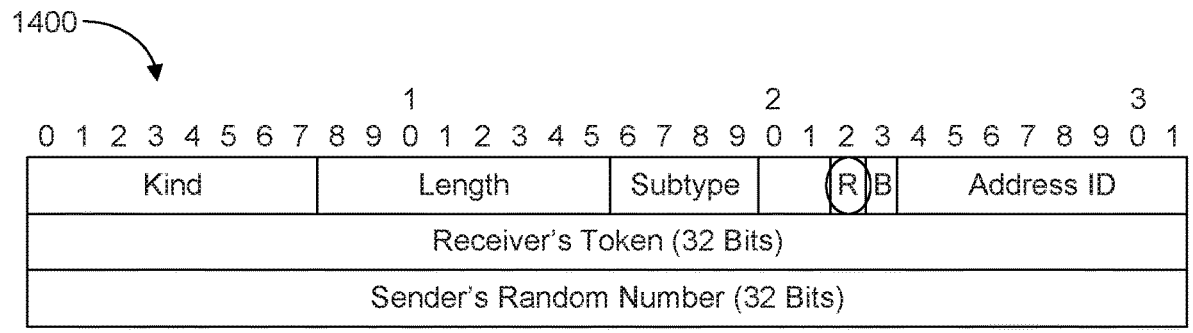
FIG. 14 is a bitmap illustrating an example modified join connection (MP_JOIN) option.
Figure 15:
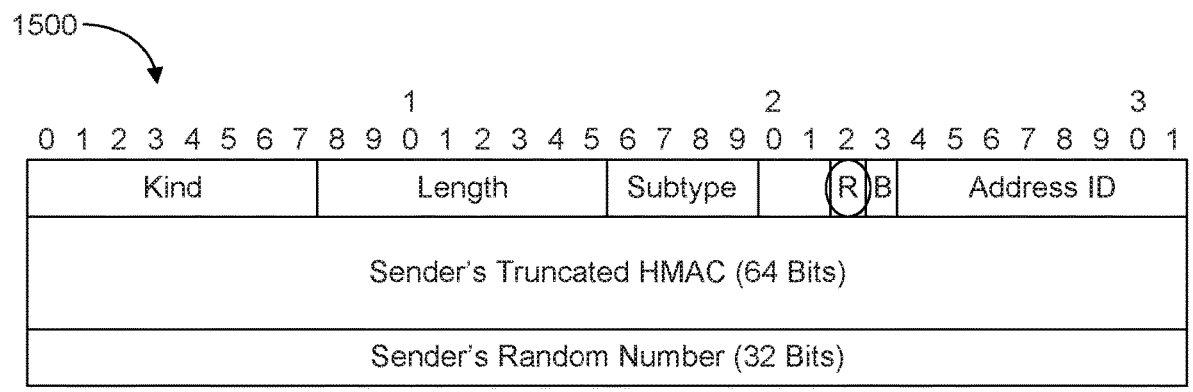
FIG. 15 is a bitmap illustrating an example modified join connection (MP_JOIN) option.

Various MPTCP protocols and messages may be modified and defined to support MPTCP session transfer. For example, FIG. 14 is a bitmap 1400 illustrating an example modified join connection (MP_JOIN) option, for initial SYN. FIG. 15 is a bitmap 1500 illustrating an example modified join connection (MP_JOIN) option, for responding SYN/AC). The MP_JOIN option, as discussed herein, may be further enhanced to support sub-flows of priority RELOCATION.

The new sub-flow priority may be expressed as: RELOCATION—R bit in MSG. In some implementations, an example flag (R) is set to (1) to establish a sub-flow to be used for information transfer related to MPTCP session relocation between current & target MPTCP stacks (e.g. server-to-server); otherwise, it may be set to (0).

MP_SET_INFO is an option that may be used to transfer MPTCP session information from the current MPTCP stack to the target MPTCP stack in preparation for MPTCP session transfer. MP_SET_INFO may also be used during the completion phase to update the dynamic information which may have changed during the preparation phase. Examples of information which may be transferred using this option include: security key from ME host 1 (i.e., the initial host) and MPTCP peer running on WTRU, token, MPTCP session sequence number.

MP_RELOC_READY is an option that may be used by the target MPTCP stack toward the current MPTCP stack to trigger completion of the MPTCP session transfer. MP_RELOC_READY may indicate that the target MPTCP stack is ready to complete the transfer.

Some embodiments include an ME App transfer mechanism to support maintained connectivity (i.e., where there is no need for an App to start a new TCP session on a target host). Such mechanism may include re-using the same socket number for both the ME App and the MPTCP stack. For MPTCP, the socket info may be saved in the MPTCP session related information that is transferred onto the target host. For the ME App, the socket number may also need to be added to the information to be transferred onto the target host.

In some cases, the MPTCP stack may already be running on the target ME host and MPTCP sessions may already exist, where one of them may be using the same session number (or socket number) as the transferred session. To address such cases, in some embodiments, the MPTCP socket file descriptor (fd) value may be made different from the regular TCP socket fd (e.g., MPTCP generates its own socket values using a seed unique to its ME host). The probabilities of such a number being generated on another ME host may be very low. In the unlikely case where the exact same socket number already exists on the target platform, the MPTCP stack may create a new socket number to be used on the target platform. This new number may be associated with the transferred MPTCP session and may be signaled to the orchestrator/MEPM/MEP. The new socket number may then be transferred to the ME App and added to its information to be transferred.

In one embodiment a WTRU may initiate creation of a PRE_ALLOCATED Sub-Flow. NAT may prevent an ME host from establishing a new sub-flow toward the WTRU. In such cases, the target ME host may communicate its available address to the current ME host. The current ME host, which may already be in communication with the WTRU, may advertise the target host available address to the WTRU using a MPTCP ADD_ADDR option.

Figure 16:
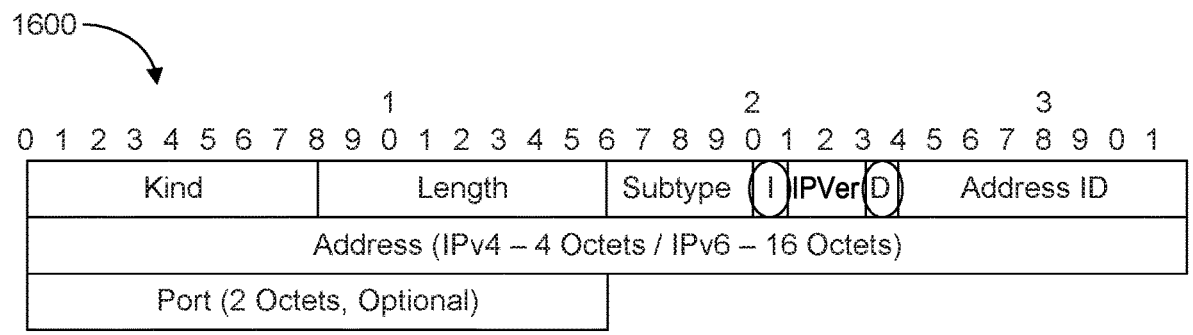
FIG. 16 is a bitmap illustrating an example modified add address (ADD_ADDR) option.

FIG. 16 is a bitmap 1600 illustrating an example modified add address (ADD_ADDR) option. The ME host may not have the control of whether or when the WTRU may create the new sub-flow (i.e., based on the MPTCP ADD_ADDR message). In some embodiments, the ME host may not be able to force the WTRU to (or advertise that the WTRU should) create this new sub-flow with the priority set to "pre_allocated".

Accordingly, in some embodiments, the ME host may accomplish this using the modified ADD_ADDR option of FIG. 16. In bitmap 1600, the IPVer field may represent the IP address version (i.e., IPv4 or IPv6). Thus, this field of 4 bits may be set to 0100 (4) or 0110 (6). Accordingly, two bits may be enough to encode the version, the leftmost bit and rightmost bit always being 0. Thus, in some embodiments, these two bits may be used to encode other information, for example the priority and an immediate bit, which informs the receiver to immediately create a sub-flow toward the specified address. As seen in FIG. 16, in some embodiments, bit "D" may be set to 1 to indicate DON'T_USE (pre_allocated) priority, set to 0 to indicate REGULAR. In some embodiments, bit "I" may be set to 1 to indicate that immediate creation of the sub-flow is required, otherwise, it may be set to 0.

Figure 17:
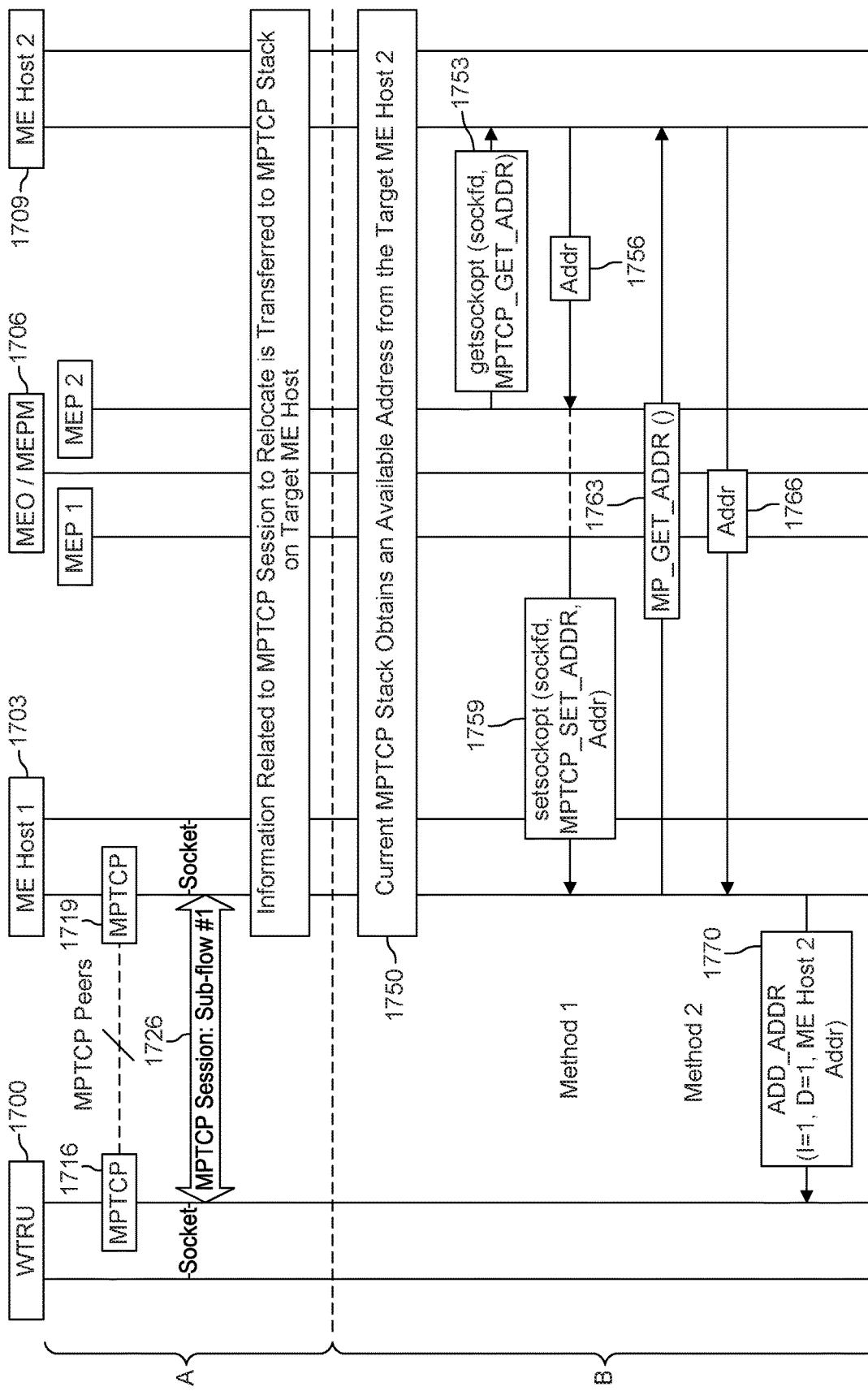
FIG. 17A is a message sequence chart illustrating an example network address translation (NAT) use case for WTRU initiated PRE_ALLOCATED sub-flow creation.
FIG. 17B is a message sequence chart continuing the illustration of an example network address translation (NAT) use case for WTRU initiated PRE_ALLOCATED sub-flow creation from FIG. 17A.
Figure 17:
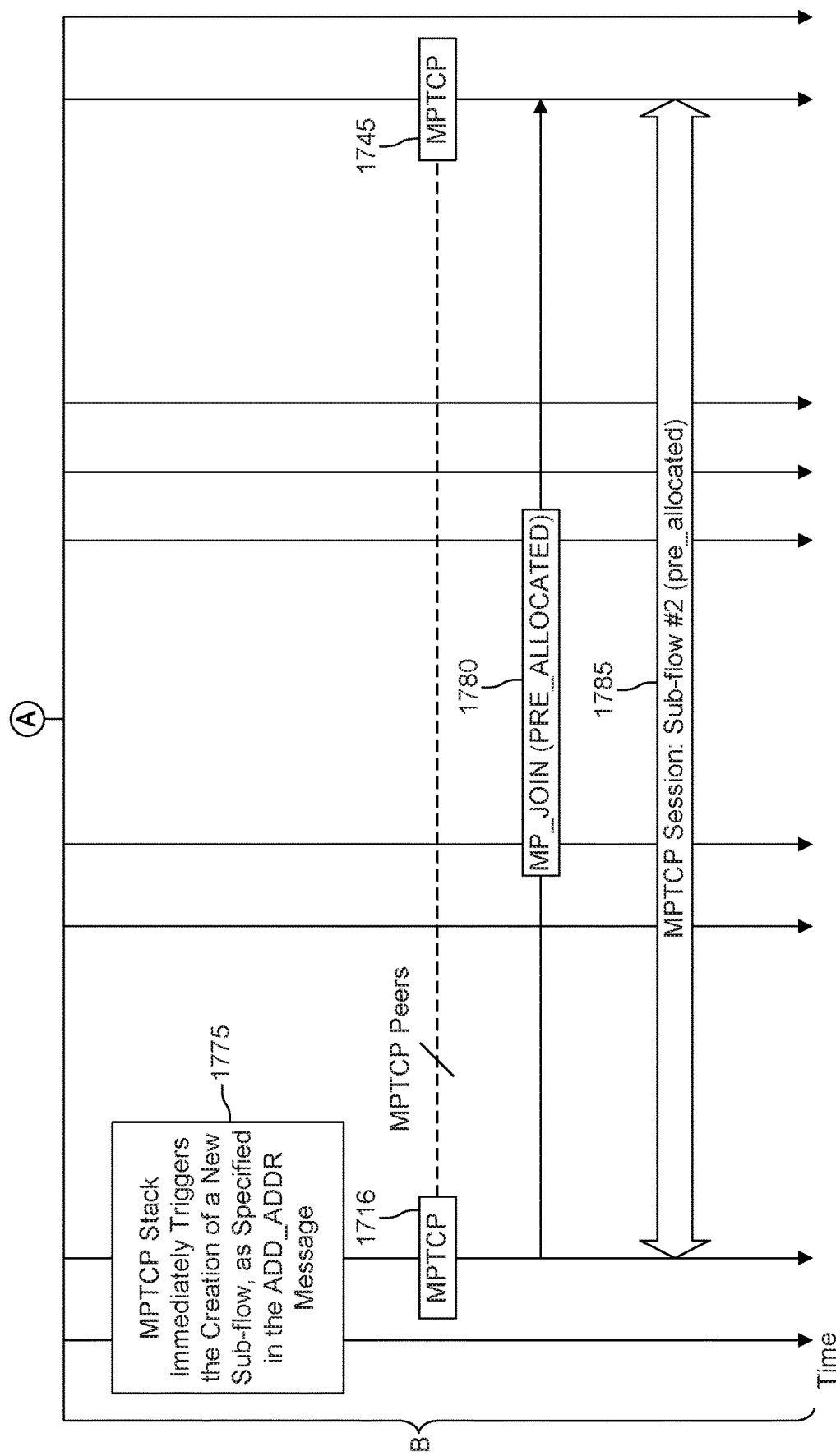

FIG. 17 is a message sequence chart which illustrates an example NAT use case where the WTRU initiates creation of a PRE_ALLOCATED sub-flow, and illustrates an example of the MPTCP session transfer, using either the first method (i.e., where MPTCP session transfer is coordinated by an orchestrator using socket APIs) or the second method (i.e., where MPTCP session transfer is handled via direct communication between the MPTCP stack on the current ME host and the MPTCP stack on a target ME host) discussed herein. FIG. 17 illustrates example communications among a WTRU 1700, a first ME host 1703, an MEO 1706 (or MEPM), and a second ME host 1709. In this example, MEO 1706 is illustrated together with its associated MEP instances MEP 1 and MEP 2. In this figure, MEP 1 and MEP 2 are running on ME host 1703 and ME host 1709 respectively to interact with the MEO 1706. The message sequence chart of FIG. 17 is shown and described in two sections, A and B.

The operations and signaling shown in section A are or similar to those shown and described with respect to FIG. 12 and FIG. 7. Accordingly, a detailed description of section A is omitted for brevity. In section B, the current MPTCP stack

1719 may obtain an available address from the target ME host 1709 in step 1750 using either the first method or the second method.

For example, using method 1, the MEO 1706 may use getsockopt (sockfd, MPTCP_GET_ADDR) at 1753 where the socket descriptor and the request MPTCP_GET_ADDR, may be specified on the request and the address may be returned in response message 1756. MEO 1706 may then use setsockopt (sockfd, MPTCP_GET_ADDR) at 1759 to configure this address onto the initial ME host 1703. In another example, using method 2, initial ME host 1703 may send MP_GET_ADDR (MPTCP session id, addr) to target ME host 1709 in message 1763. The session may be provided in this request and the address may be returned in response message 1766.

In either case, the initial ME host 1703 may send this address to the WTRU (using MPTCP message ADD_ADDR) in message 1770, requesting at the same time the immediate creation of a new pre-allocated sub-flow (e.g., using bits 1=1, and D=1 as further discussed herein). In step 1775, the WTRU 1700, receiving this request, may initiate the creation of a pre_allocated sub-flow toward the received address, which in this example, is toward the target ME host 1709. The WTRU 1700 may select, among its available addresses, one which has been obtained from the current anchor node (i.e., target ME host 1709). MPTCP stack 1716 on WTRU 1700 sends an MPTCP message 1780 (in this example, an MP_JOIN(PRE_ALLOCATED) message) to MPTCP stack 1745 on target ME host 1709 to initiate creation of the sub-flow, and a new pre_allocated sub-flow 1785 is thus created between the WTRU 1700 and target ME host 1709.

It is noted that this pre_allocated sub-flow creation involves three peers. The initial ME host 1703 triggers the sub-flow creation by configuring the address to be used for the sub-flow and by specifying "immediate creation". The WTRU 1700 and target ME host 1709 exchange messages to setup the sub-flow.

Some embodiments include MPTCP-aware ME Apps. The MPTCP session transfer process, as described above, may assume the ME Apps are not aware of MPTCP usage. In some embodiments however, the transfer process may be used with MPTCP-aware applications, e.g., with minor modifications to take advantage of MPTCP-specific APIs.

For example, an ME App executing on a current ME host may trigger an MPTCP session transfer using MPTCP-specific APIs. In cases where the ME App to be transferred is aware of MPTCP usage, the ME App itself may request the MPTCP session transfer. For the App, the sockfd may be associated with the communication channel which needs to follow the App transfer. The ME App may request MPTCP session mobility, passing the appropriate socket file descriptor (sockfd) to the MPTCP stack using MPTCP-specific socket APIs. The orchestrator may trigger the ME App transfer but may not be involved in the MPTCP session transfer.

An ME App instance may be transferred to the target ME host (if it is not already running) as well as the MPTCP session. The MPTCP-aware ME App on the current (source) ME host may handle the MPTCP session transfer by obtaining the MPTCP specific information to be transferred and by transferring it onto the target ME host. This transfer may be handled at the ME App level. Once the MPTCP session information is received by the ME App on the target ME host, it may be passed to the MPTCP stack. The socket API as defined for the first method (i.e., where MPTCP session transfer is coordinated by an orchestrator using socket APIs) or the second method (i.e., where MPTCP session transfer is handled via direct communication between the MPTCP stack on the current ME host and the MPTCP stack on a target ME host) discussed herein may be used. The sockfd (which corresponds to the MPTCP session identifier) may be modified, if already in use on the target ME host.

The ME App on the source (initial) ME host obtains information about the MPTCP session to be transferred from the local MPTCP stack (possibly using the socket interface), i.e. SRC App→GET info to be transferred (sockfd)→SRC MPTCP. The ME App on the initial ME host transfers the MPTCP session information to the ME App on the target ME host, i.e. SRC App→Transfer MPTCP session related info→DST App. The ME App on the target ME host configures the local MPTCP stack with the receives information about the MPTCP session (possibly using the socket interface), i.e. DST App→SET MPTCP info from transfer (sockfd)→DST MPTCP.

MPTCP session adaptation onto the target ME host may be handled via an MPTCP-specific API. An MPTCP event "MPTCP session transfer completed" may be used for this purpose. The ME App may receive this event when the MPTCP transfer is completed, specifying at the same time the new socket number to be used at this point to continue communication with the remote peer (i.e., WTRU). The sockfd may remain the same, meaning it may not change if it is not already used on the target ME host. If this sockfd value is already used, then a new number may be generated by the MPTCP stack and associated to the transferred MPTCP session. This new number may be sent to the ME App locally on the target ME host via this new MPTCP-specific event. The MPTCP stack→MPTCP transfer completed (original_sockfd, new_sockfd)→ME App.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented in a wireless transmit/receive unit (WTRU), the method comprising:
   communicating data traffic over a transmission control protocol (TCP) session with a multipoint transmission control protocol (MPTCP) stack running on the WTRU;
   anchoring to a first mobile edge (ME) device;
   exchanging the data traffic with a server application over a first MPTCP sub-flow on the first ME host device;
   wherein the first MPTCP sub-flow is configured to a regular priority, sub-flow wherein the regular priority means that a subflow is to be used now;

anchoring to a second ME host device;

responsive to anchoring to the second ME host device, receiving a first message, from the second ME host device, indicating to the WTRU an establishment of a second MPTCP sub-flow;

responsive to the first message, accepting the establishment of the second MPTCP sub-flow, wherein the second MPTCP sub-flow is configured to a pre-allocated priority, wherein the pre-allocated priority means that a subflow is created but not yet to be used to exchange data traffic;

after the second MPTCP sub-flow is established, receiving a second message, from the second ME host device, indicating configuring the second MPTCP sub-flow to the regular priority to start to exchange data traffic;

responsive to the second message, changing the configuration of the second MPTCP sub-flow from the pre-allocated priority configuration to the regular priority configuration, and exchanging the data traffic with the server application over the second MPTCP sub-flow on the second ME host device;

changing the configuration of the first MPTCP sub flow to a not-available priority, wherein the not-available priority means that a subflow is maintained but no longer used for data traffic; and closing any other MPTCP sub flow associated with the first ME host device.

2. The method of claim 1, wherein the second message comprises an MP_PRIO message.

3. The method of claim 1, wherein the first message comprises an MP_JOIN message.

4. A wireless transmit/receive unit (WTRU) comprising:

a processor configured to communicate data traffic over a transmission control protocol (TCP) session with a multipoint transmission control protocol (MPTCP) stack running on the WTRU;

the processor configured to anchor to a first mobile edge (ME) host device;

the processor configured to exchange the data traffic with a server application over a first MPTCP sub-flow on the first ME host device, wherein the first MPTCP sub-flow is configured to a regular priority, wherein the regular priority means that a subflow is to be used now;

the processor configured to anchor to a second ME host device;

the processor configured to, responsive to anchoring to the second ME host device, receive a first message, from the second ME host device, indicating to the WTRU an establishment a second MPTCP sub-flow;

the processor configured to, responsive to the first message, accepting the establishment of the second MPTCP sub-flow, wherein the second MPTCP sub-flow is configured to a pre-allocated priority, wherein the pre-allocated priority means that a subflow is created but not yet to be used to exchange data traffic;

the processor configured to, after the second MPTCP sub-flow is established, receive a second message, from the second ME host device, indicating configuring the second MPTCP sub-flow to the regular priority to start to exchange data traffic;

the processor configured to, responsive to the second message, change the configuration of the second MPTCP sub-flow from the pre-allocated priority configuration to the regular priority configuration, and exchange the data traffic with the server application over the second MPTCP sub-flow on the second ME host device;

the processor configured to change the configuration of the first MPTCP sub flow to a not-available priority, wherein the not-available priority means that a subflow is maintained but no longer used for data traffic; and the processor configured to close any other MPTCP sub flow associated with the first ME host device.

5. The WTRU of claim 4, wherein the second message comprises an MP_PRIO message.

6. The WTRU of claim 4, wherein the first message comprises an MP_JOIN message.

* * * * *